US 10,766,538 B2

(12) United States Patent
Jhant et al.

(10) Patent No.: US 10,766,538 B2
(45) Date of Patent: Sep. 8, 2020

(54) AUXILIARY CARGO STORAGE BIN

(71) Applicant: Textron Inc., Providence, RI (US)

(72) Inventors: Philip Jhant, North Augusta, SC (US); Matthew Baekelandt, North Augusta, SC (US); Christopher Furman, Augusta, GA (US)

(73) Assignee: Textron Inc., Providence, RI (US)

(*) Notice: Subject to any disclaimer, the term of this patent is extended or adjusted under 35 U.S.C. 154(b) by 0 days.

(21) Appl. No.: 16/695,410

(22) Filed: Nov. 26, 2019

(65) Prior Publication Data

US 2020/0094876 A1 Mar. 26, 2020

Related U.S. Application Data

(63) Continuation of application No. 15/975,551, filed on May 9, 2018, now Pat. No. 10,526,019, which is a continuation of application No. 14/973,926, filed on Dec. 18, 2015, now Pat. No. 9,994,259.

(51) Int. Cl.
*B60R 5/00* (2006.01)
*B62D 21/18* (2006.01)
*B60R 7/00* (2006.01)

(52) U.S. Cl.
CPC .............. *B62D 21/183* (2013.01); *B60R 5/00* (2013.01); *B60R 7/00* (2013.01)

(58) Field of Classification Search
CPC .... B60R 7/00; B60R 7/02; B60R 7/04; B60R 9/00
See application file for complete search history.

(56) References Cited

U.S. PATENT DOCUMENTS

| 3,806,183 | A | 4/1974 | Sieren et al. |
| 4,126,349 | A | 11/1978 | Nelson et al. |
| 4,728,017 | A | 3/1988 | Mullican |
| 4,917,430 | A | 4/1990 | Lawrence |
| 5,316,358 | A | 5/1994 | Payne et al. |
| 5,934,727 | A | 8/1999 | Storc et al. |
| 5,979,725 | A | 11/1999 | Lehrman |
| 6,059,159 | A * | 5/2000 | Fisher ..................... B60R 9/00 224/309 |
| 6,237,981 | B1 | 5/2001 | Selleck |
| 6,254,162 | B1 | 7/2001 | Faber et al. |
| 6,557,918 | B2 * | 5/2003 | Iafrate ..................... B60P 3/40 224/403 |
| 6,644,709 | B2 * | 11/2003 | Inagaki ................ B60N 2/3013 296/37.14 |
| 6,752,304 | B1 * | 6/2004 | Hotary ................... B60K 37/00 224/544 |
| 6,874,667 | B2 | 4/2005 | Dykstra et al. |
| 6,905,159 | B1 | 6/2005 | Saito et al. |
| 6,994,388 | B2 | 2/2006 | Saito et al. |
| 7,090,274 | B1 * | 8/2006 | Khan ..................... B60N 2/36 296/37.14 |

(Continued)

Primary Examiner — James A English
(74) Attorney, Agent, or Firm — Sandberg Phoenix & von Gontard PC

(57) ABSTRACT

A vehicle auxiliary storage compartment comprising a floor, a back wall that extends upward from the floor, and a front wall that extends upward from floor opposite the back wall, and a pair of opposing sidewalls disposed at opposing ends of the front wall and the back wall. The front wall is defined by a back side of a seating structure of a vehicle in which the auxiliary storage compartment is disposed.

20 Claims, 15 Drawing Sheets

(56) References Cited

U.S. PATENT DOCUMENTS

| | | | |
|---|---|---|---|
| 7,219,941 B1 | 5/2007 | San Paolo et al. | |
| 7,281,742 B2 | 10/2007 | Porter, II et al. | |
| 7,578,544 B1 | 8/2009 | Shimamura et al. | |
| 7,581,780 B2 | 9/2009 | Shimamura et al. | |
| 7,878,568 B2 * | 2/2011 | Wu | B60R 9/00 |
| | | | 224/405 |
| 7,971,919 B2 | 7/2011 | Vertanen | |
| 8,075,040 B2 | 12/2011 | Arnold | |
| 8,226,144 B2 | 7/2012 | Sheikhha et al. | |
| 8,322,767 B2 | 12/2012 | Morita et al. | |
| 8,672,387 B1 | 3/2014 | Kaku et al. | |
| 9,039,060 B1 | 5/2015 | Yamamoto et al. | |
| 9,376,147 B2 | 6/2016 | Craven et al. | |
| 9,683,531 B2 | 6/2017 | Osaki | |
| 2002/0014785 A1 | 2/2002 | Sotiroff et al. | |
| 2008/0191506 A1 | 8/2008 | Huotari et al. | |
| 2010/0066152 A1 | 3/2010 | King et al. | |
| 2011/0148146 A1 | 6/2011 | Takaya et al. | |
| 2011/0156420 A1 | 6/2011 | Yasui et al. | |
| 2011/0156423 A1 | 6/2011 | Kawabata et al. | |
| 2011/0169289 A1 * | 7/2011 | Arnold | B60P 3/423 |
| | | | 296/10 |
| 2012/0032465 A1 | 2/2012 | Morita et al. | |
| 2012/0056411 A1 | 3/2012 | Nakamura et al. | |
| 2012/0267404 A1 | 10/2012 | Rottinghaus et al. | |
| 2013/0270854 A1 * | 10/2013 | Weller | B60R 9/00 |
| | | | 296/37.6 |
| 2014/0124279 A1 | 5/2014 | Schlangen et al. | |
| 2014/0262583 A1 | 9/2014 | Url | |
| 2014/0353955 A1 | 12/2014 | Bhardwaj et al. | |
| 2016/0185271 A1 | 6/2016 | Tsumiyama et al. | |
| 2016/0193949 A1 | 7/2016 | Pywell | |

* cited by examiner

AUXILIARY CARGO STORAGE BIN

CROSS-REFERENCE TO RELATED APPLICATIONS

This application is a continuation of U.S. patent application Ser. No. 15/975,551 filed on May 9, 2018, which is a continuation of U.S. patent application Ser. No. 14/973,926 filed on Dec. 18, 2015. The disclosure of the above application is incorporated herein by reference in its entirety.

FIELD

The present disclosure relates to utility vehicles and more particularly to an auxiliary storage compartment disposed between the cargo bed and passenger compartment of such vehicles.

BACKGROUND

The statements in this section merely provide background information related to the present disclosure and may not constitute prior art.

Most lightweight vehicles that are not designated for use on roadways, e.g., maintenance vehicles, cargo vehicles, shuttle vehicles, golf cars, all-terrain vehicles, utility terrain vehicles, utility task vehicles, recreational off highway vehicles, worksite vehicles, buggies, or other lightweight vehicles, typically provide a passenger compartment having one or more small article storage bins, wells and/or pockets located in and/or around the dash structure for holding or storing various user articles such as cell phones, sunglasses, hats, gloves, food, drinks, small hand tools, etc. However, due to their typically smaller size, users often find it infeasible to stow personal gear such as backpacks, duffle bags, sleeping bags, smaller or more fragile camping equipment, rifles, handguns, bows, etc., in the small article storage bins, wells and/or pockets provided in the dash structure.

Additionally, such vehicles often include a cargo bed disposed on a rear portion of the chassis that serves as a generic area for hauling equipment such as shovels, wheelbarrows, lawn mowers and other motorized equipment, and various payloads such as gravel, rock, soil, debris, garbage, wood, etc. Generally, such cargo beds are not covered and are exposed to the environmental elements such as sun, rain, sleet, snow, etc. Due to the large size, general dirtiness and exposure to environmental elements of such cargo beds, users often find it undesirable to stow personal gear the cargo beds of vehicles. Particularly, when stowed in the cargo bed, such personal items are exposed to the environmental elements where they can get dirty, wet, too hot, etc., and often such personal items must be tied or held down to prevent them from moving around in the bed during operation of the vehicle.

SUMMARY

The present disclosure provides an auxiliary storage compartment for a vehicle, wherein, in various embodiments, the auxiliary storage compartment includes a front wall, a pair of opposing sidewalls and a back wall that is disposed laterally between the sidewalls. The auxiliary storage compartment additionally includes a floor disposed between the front wall and the back wall. In various embodiments, at least one of the sidewalls comprises an access door movable between an Open position, wherein access to the auxiliary storage compartment is provided via the open access door, and a Closed position, wherein the closed access door defines the respective sidewall.

The present disclosure also provides a vehicle, wherein the vehicle includes a chassis, a plurality of wheels rotationally connected to the chassis, and a drivetrain operatively connected to at least one of the wheels. The vehicle additionally includes a prime mover (e.g., an electric motor and/or an internal combustion engine) mounted to the chassis that is/are operatively connected to the drivetrain to provide motive force, via the drivetrain, to the at least one of the wheels. The vehicle further includes a cargo bed mounted to the chassis for holding tools, equipment, payloads, etc., and a passenger compartment or cabin mounted to the chassis, wherein the passenger compartment includes a dash structure, a floorboard, and a passenger seating structure that can comprise a bench seat, a pair of side-by-side seats, or any other suitable passenger seating structure. In various embodiments, the vehicle includes an auxiliary storage compartment disposed between the passenger compartment and the cargo bed, wherein the auxiliary storage compartment comprises a floor, a front wall, a back wall, and a pair of opposing sidewalls disposed between the front wall and the back wall. In some embodiments, the vehicle further includes a roll over protection structure connected to the chassis and disposed over the passenger compartment and the auxiliary storage compartment, and a roof connected to the roll over protection structure. In various implementations, the roof can be sized to be disposed over the passenger compartment and the auxiliary storage compartment such that both the passenger cabin and the auxiliary storage compartment are protected from environmental elements, such as rain, snow, sleet, etc.

This Summary is provided merely for purposes of summarizing some example embodiments of the present disclosure so as to provide a basic understanding of some aspects of the teachings herein. Accordingly, it will be appreciated that the above described example embodiments are merely examples and should not be construed to narrow the scope or spirit of the disclosure in any way.

Other embodiments, aspects, and advantages will become apparent from the following detailed description taken in conjunction with the accompanying drawings which illustrate, by way of example, the principles of the described embodiments. It should be understood that the description and specific examples are intended for purposes of illustration only and are not intended to limit the scope of the present teachings.

DRAWINGS

The drawings described herein are for illustration purposes only and are not intended to limit the scope of the present teachings in any way.

Corresponding reference numerals indicate corresponding parts throughout the several views of drawings.

DETAILED DESCRIPTION

Figure 1:
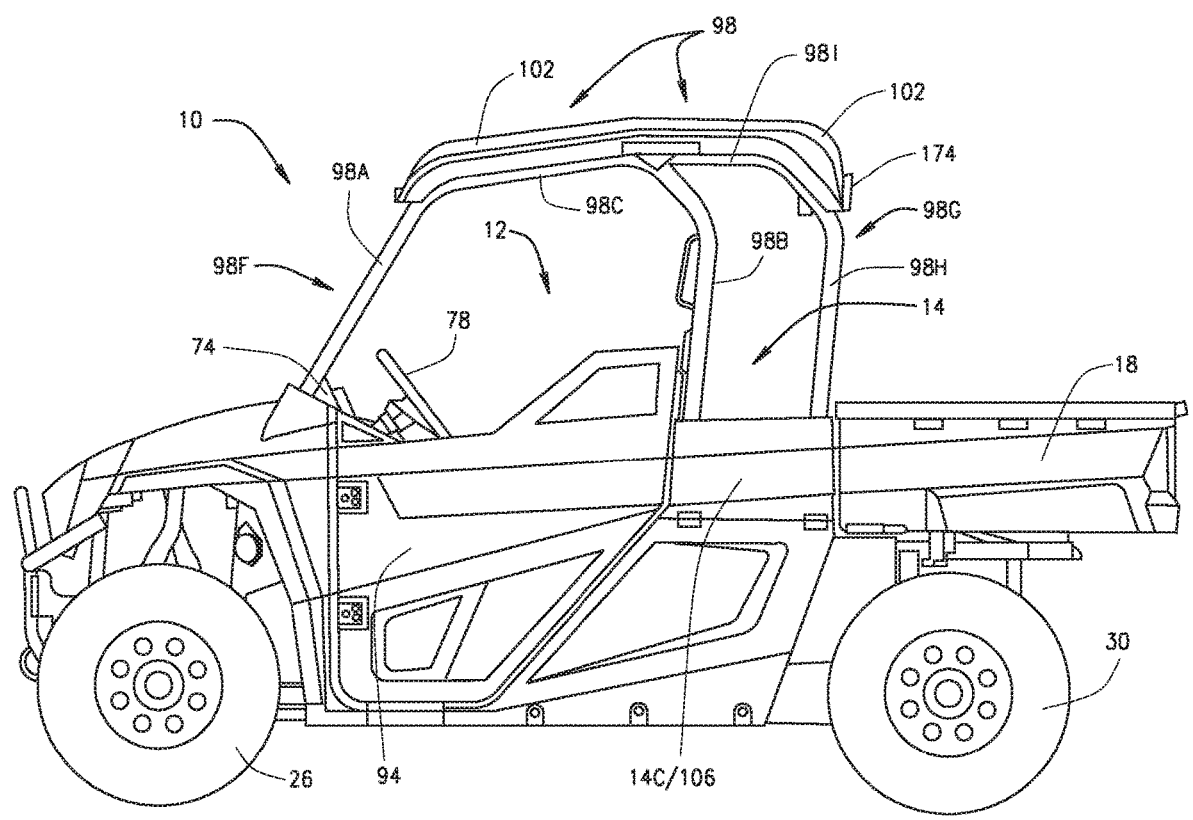
FIG. 1 is a side view of a vehicle including a passenger compartment, a cargo bed, and an auxiliary storage compartment disposed between the passenger compartment and the cargo bed, in accordance with various embodiments of the present disclosure.
Figure 2:
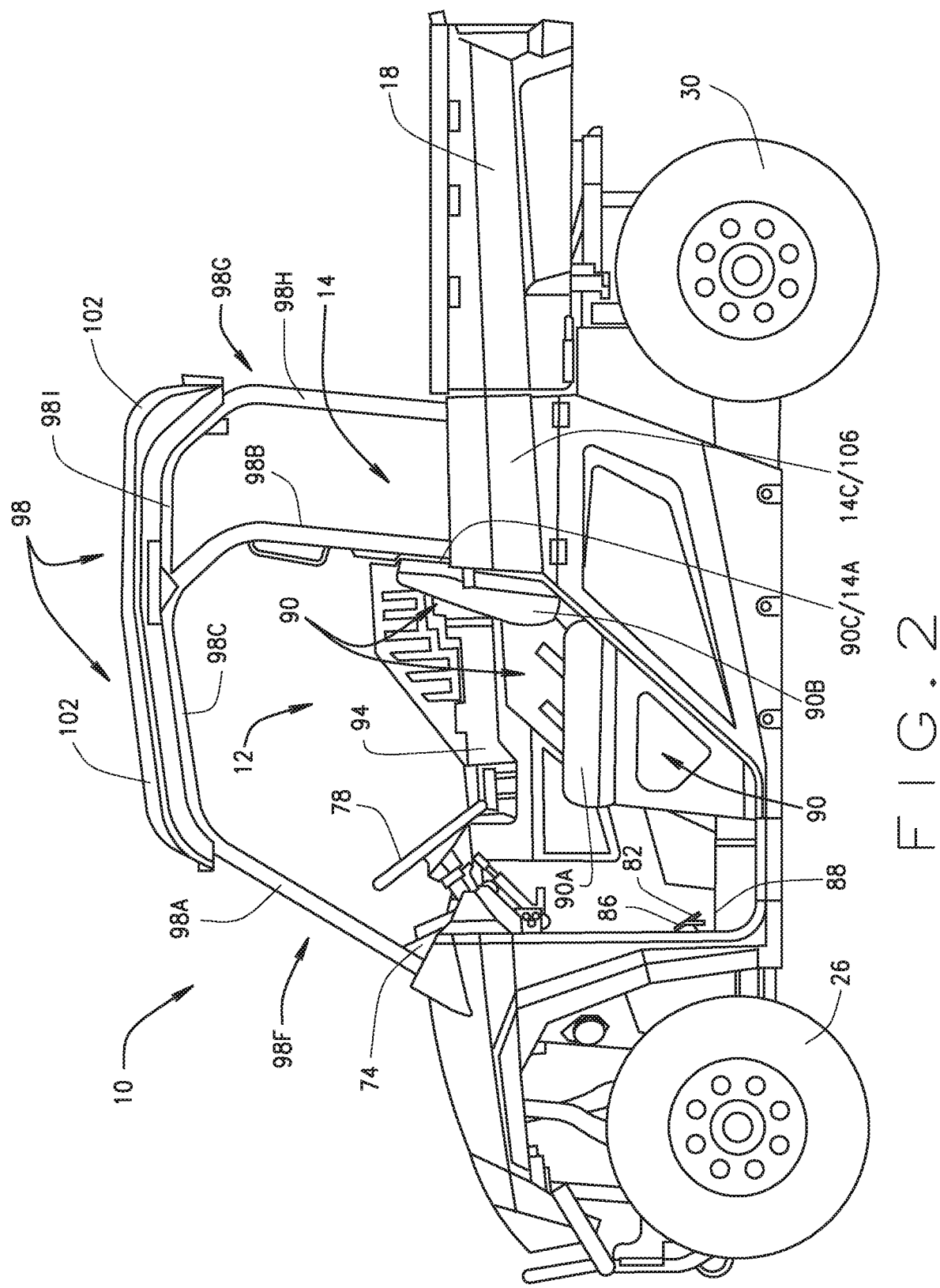
FIG. 2 is a side view of the vehicle shown in FIG. 1 having a driver's side door removed to illustrate an interior of the passenger compartment, in accordance with various embodiments of the present disclosure.

The following description is merely exemplary in nature and is in no way intended to limit the present teachings, application, or uses. Throughout this specification, like reference numerals will be used to refer to like elements.

The embodiments disclosed below are not intended to be exhaustive or to limit the invention to the precise forms disclosed in the following detailed description. Rather, the embodiments are chosen and described so that others skilled in the art can utilize their teachings.

Unless otherwise defined, all technical and scientific terms used herein have the same meaning as commonly understood by one of ordinary skill in the art to which this disclosure belongs. The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps can be employed.

If an element, component, device, object, etc., is referred to as being "on," "engaged to or with," "connected to or with," or "coupled to or with" another element, component, device, object, etc., it can be directly on, engaged, connected or coupled to or with the other element, device, object, etc., or intervening elements, devices, objects, etc., can be present. In contrast, when an element is referred to as being "directly on," "directly engaged to," "directly connected to," or "directly coupled to" another element, device object, etc., there may be no intervening elements, devices, objects, etc., present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. can be used herein to describe various elements, components, regions, devices, objects, sections, etc., these elements, components, regions, devices, objects, sections, etc., should not be limited by these terms. These terms may be used only to distinguish one element, component, region, device, object, section, etc., from another region, device, object, section etc., and do not necessarily imply a sequence or order unless clearly indicated by the context.

Referring to FIGS. 1, 2, 3 and 4, in various embodiments, the present disclosure provides a vehicle 10 that includes a passenger compartment 12, an autonomous, independent auxiliary storage compartment 14, and a cargo bed 18. The autonomous, independent auxiliary storage compartment 14, and the various features thereof (as described herein) is structured and operable for stowing personal gear, hand tools and other items that the vehicle operator may find undesirable to stow in a cargo bed 18 of the vehicle 10. For example, the auxiliary storage compartment 14 can be used to stow such things as backpacks, duffle bags, sleeping bags, smaller and/or more fragile camping equipment, rifles, handguns, bows, hand tools, etc.

Figure 3:
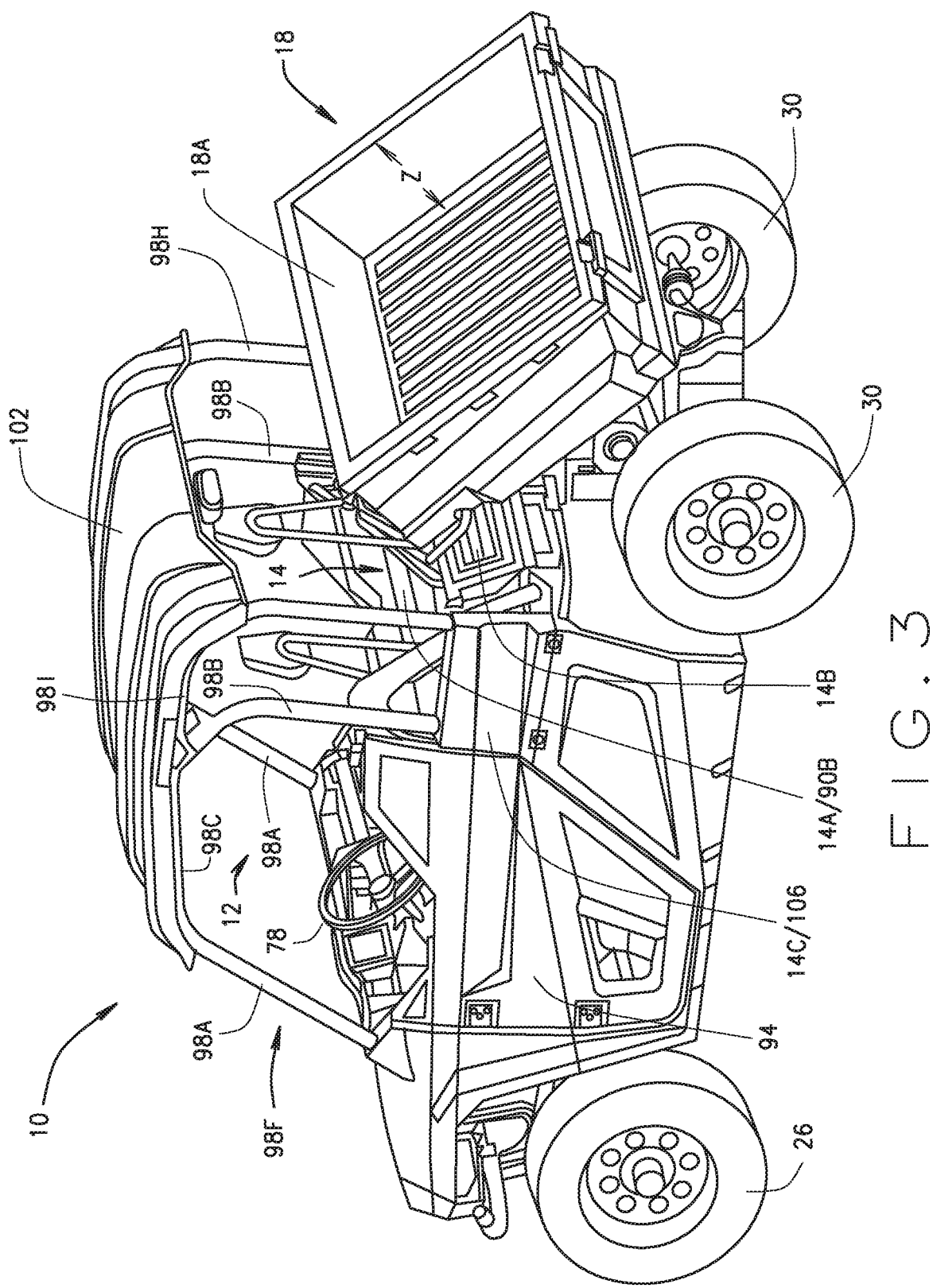
FIG. 3 is a side view of the vehicle shown in FIG. 1, wherein the cargo bed is a dump or lift bed operable to have a forward portion lifted in order to dump or easily extract items or materials from the cargo bed, in accordance with various embodiments of the present disclosure.
Figure 4:
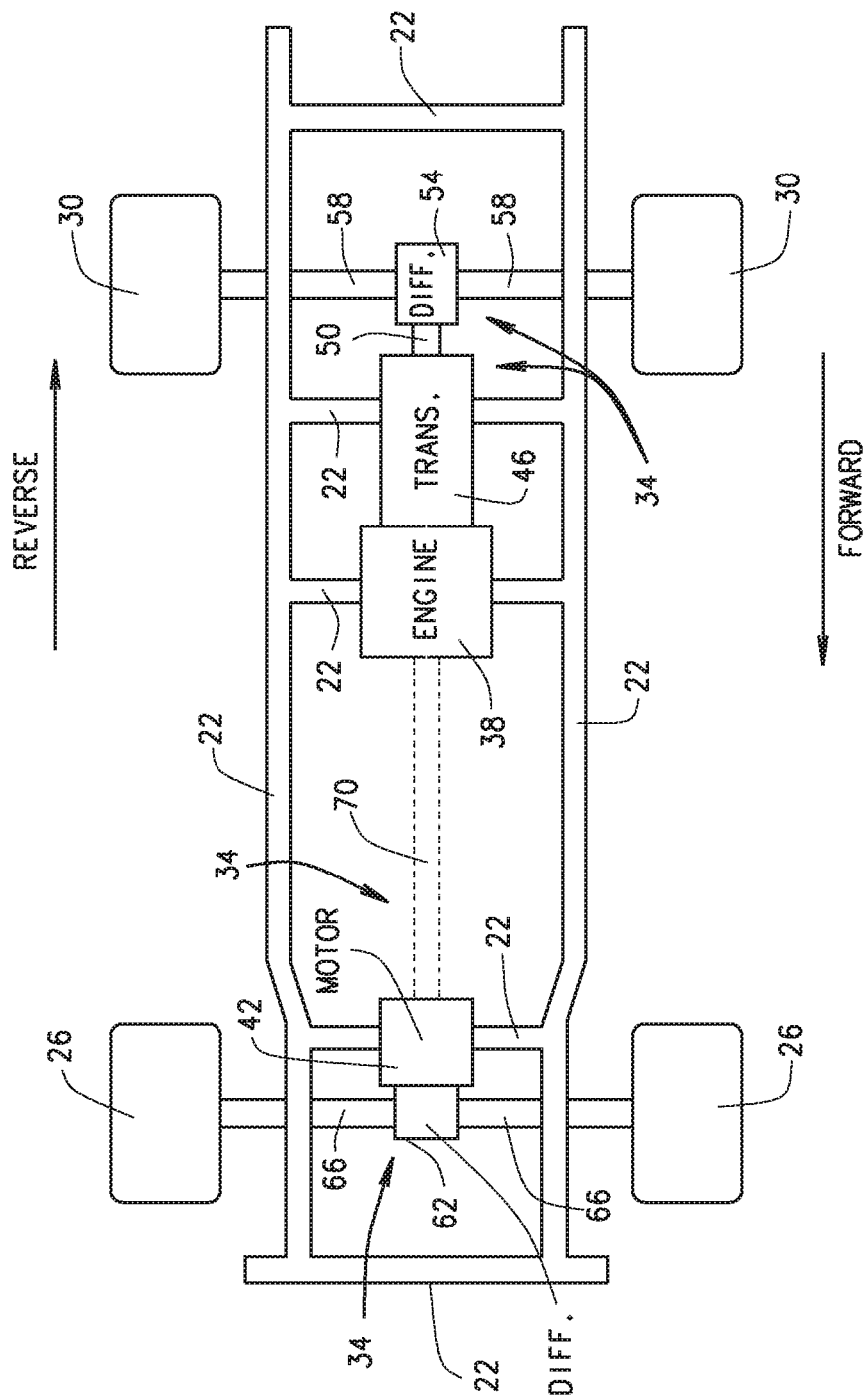
FIG. 4 is a schematic of a chassis and drivetrain of the vehicle shown in FIG. 1, in accordance with various embodiments of the present disclosure.

In contrast, the cargo bed 18, as are most known utility vehicle cargo beds, is designed and used for hauling various payloads such as gravel, rock, soil, debris, garbage, wood, etc., and/or larger tools and equipment such as shovels, rakes, wheelbarrows, lawn mowers, chain saws, other motorized equipment, etc. In various implementations, the cargo bed 18 can be a fixed or stationary bed, wherein the cargo bed 18 is fixedly connected to a chassis 22 and/or other frame structure of the vehicle 10, while in other implementations the cargo bed 18 can be a lift or dump bed, wherein the vehicle 10 includes a lift mechanism (not shown) that is operable to lift a front portion of the cargo bed 18 (i.e., the portion of the cargo bed 18 nearest the auxiliary storage compartment 14), as shown in FIG. 3, in order to dump or easily extract items or materials from the cargo bed 18.

The vehicle 10 can be any lightweight vehicle that is not designated for use on roadways. For example, the vehicle 10 can be a utility vehicle, a maintenance vehicle, a cargo vehicle, a shuttle vehicle, a golf cart, an all-terrain vehicle, a utility terrain vehicle, a utility task vehicle, a recreational off highway vehicle, a worksite vehicle, a buggy, or any other lightweight vehicle. In various embodiments, the vehicle 10 can be structured to have a single seat, while in various other embodiments the vehicle 10 can have a side-by-side seating configuration, such as can be provided by a bench seat capable of seating two or more passengers or by two or more laterally (with regard to a longitudinal axis of the vehicle 10) spaced independent seats positioned in a side-by-side arrangement.

Generally, the vehicle 10 further includes one or more front wheels 26 operationally connected to the chassis 22, one or more rear wheels 30 operationally connected to the chassis 22, a drivetrain 34 operationally connected to at least one of the front and/or rear wheels 22 and/or 30, and at least one prime mover. The prime mover can be one of, or both of, an internal combustion engine (ICE) 38 and an electric motor 42. In various implementations wherein the vehicle 10 includes the ICE 38, the vehicle 10 additionally includes a transmission 46 operably connected to the ICE 38 and structured and operable to receive torque (e.g., motive force) generated by the ICE 34, a drive shaft 50 operatively connected to the transmission 46 and structured and operable to receive torque transferred from the ICE 38, and a first differential 54 operatively connected to the drive shaft 50 and structured and operable to distribute torque received from drive shaft 50 to at least one of the rear wheels 30, via a rear axle 58 (axle 58 can be either a split axle for an independent suspension system, or a one-piece axle). Although the ICE 38 is shown by way of example in FIG. 4 as providing torque to at least one of the rear wheels 30, it is envisioned that the ICE 38 can additionally or alternatively be operationally connected, via the transmission 46, the drive shaft 50 and the first differential 54, to deliver torque to at least one of the front wheels 26.

In various implementations wherein the vehicle 10 includes the electric motor 42, the vehicle 10 additionally includes a second differential 62 operatively connected to the electric motor 42 and structured and operable to receive torque (e.g., motive force) generated by the electric motor 42 and to distribute the torque to at least one of the front wheels 26, via a front axle 66 (axle 66 can be either a split axle for an independent suspension system, or a one-piece axle). Although the electric motor 42 is shown by way of example in FIG. 4 as providing torque to at least one of the front wheels 26, it is envisioned that the electric motor can additionally or alternatively be operationally connected, via the second differential 54, to deliver torque to at least one of the rear wheels 30. It is further envisioned that in yet other embodiments, the vehicle 10 can be configured as a 4-wheel drive vehicle, wherein at least one of the ICE 38 and/or the electric motor 42 is/are operatively connected to the first differential 54, and at least one of the ICE 38 and/or the electric motor 42 is/are operatively connected to the second differential 62 such that the ICE 38 and/or the electric motor 42 deliver torque to at least one front wheel 26 and at least one rear wheel 30. In such 4-wheel drive embodiments, the vehicle 10 can include an additional drive shaft 70 structured and operable to connect the ICE 38 and/or the electric motor 42 to the respective other first or second differential 54 or 62.

As used herein, based on the particular configuration of the prime mover of the vehicle 10, that is, based on whether the vehicle 10 includes just the ICE 38, just the electric motor 42, both the ICE 38 and the electric motor 42, and whether the vehicle 10 is configured as a 2-wheel drive vehicle or a 4-drive vehicle, the drivetrain 34 can comprise any or all of, individually or in any combination, the transmission 46, the drive shaft 50, the first differential 54, the rear axle 58, the second differential 62, front axle 66, and the additional drive shaft 70.

Referring now to FIGS. 1, 2, 3 and 5, the passenger compartment 12 generally includes: a dash console 74 that can include such things an On/Off key switch, a forward/neutral/reverse selector, one or more small accessory storage pockets, a speedometer, various other gauges and/or instrumentation, a radio, and/or various other vehicle controls; a steering wheel 78 for use by the vehicle operator to control the directional movement of the vehicle 10; a brake pedal 82 for use by the vehicle operator to control slowing and stopping of the vehicle 10; an accelerator pedal 86 for use by the vehicle operator to control the torque delivered by the prime mover(s) to one or more of the front and/or rear wheels 26 and/or 30; a floorboard 88; and a passenger seating structure 90 for supporting one or more passengers of the vehicle 10 (e.g., a driver and one or more non-drivers). The seating structure 90 can be any suitable seating structure, for example, a bench style seat or one or more side-by-side seats. The seating structure 90 comprises at least one seat bottom 90A and at least one seat back 90B. Each seat back 90B includes a front face (or side) that faces the front of the vehicle 10, against which the vehicle passenger(s) lean(s) when seated on the respective seat bottom 90A, and an opposing rear face (or side) that faces the rear of the vehicle 10. In various implementations, the one or more seat back rear faces can collectively form, define or provide what is referred to herein as the back side 90C of the seating structure 90. As described further below, in various embodiments, the seat back(s) 90B of the seating structure 90 define(s), provide(s) or form(s) a front wall 14A of the auxiliary storage compartment 14. In various embodiments, the passenger compartment 12 can further include a pair of opposing side doors 94 structured and operable to Open and Close to controllably allow and prevent ingress and egress of passengers to and from the passenger compartment 14.

In various embodiments, the vehicle 10 further includes a roll over protection system (ROPS) 98 that is disposed above and around the passenger compartment 12 and is structured and operable to protect passengers within the passenger compartment 12 in a situation where the vehicle 10 may be caused to overturn, flip or roll over. The ROPS 98 comprises a plurality of tubes, bars or beams that are connected to the chassis 22 and extend above, over and around the passenger compartment 12. The ROPS 98 can be constructed or fabricated of any material having sufficient strength and rigidity to provide protection to the passengers of the vehicle 10 should the vehicle 10 be upset and turned on its side, flipped or rolled over, e.g., high strength steel, aluminum, titanium, carbon fiber, etc.

Figure 5:
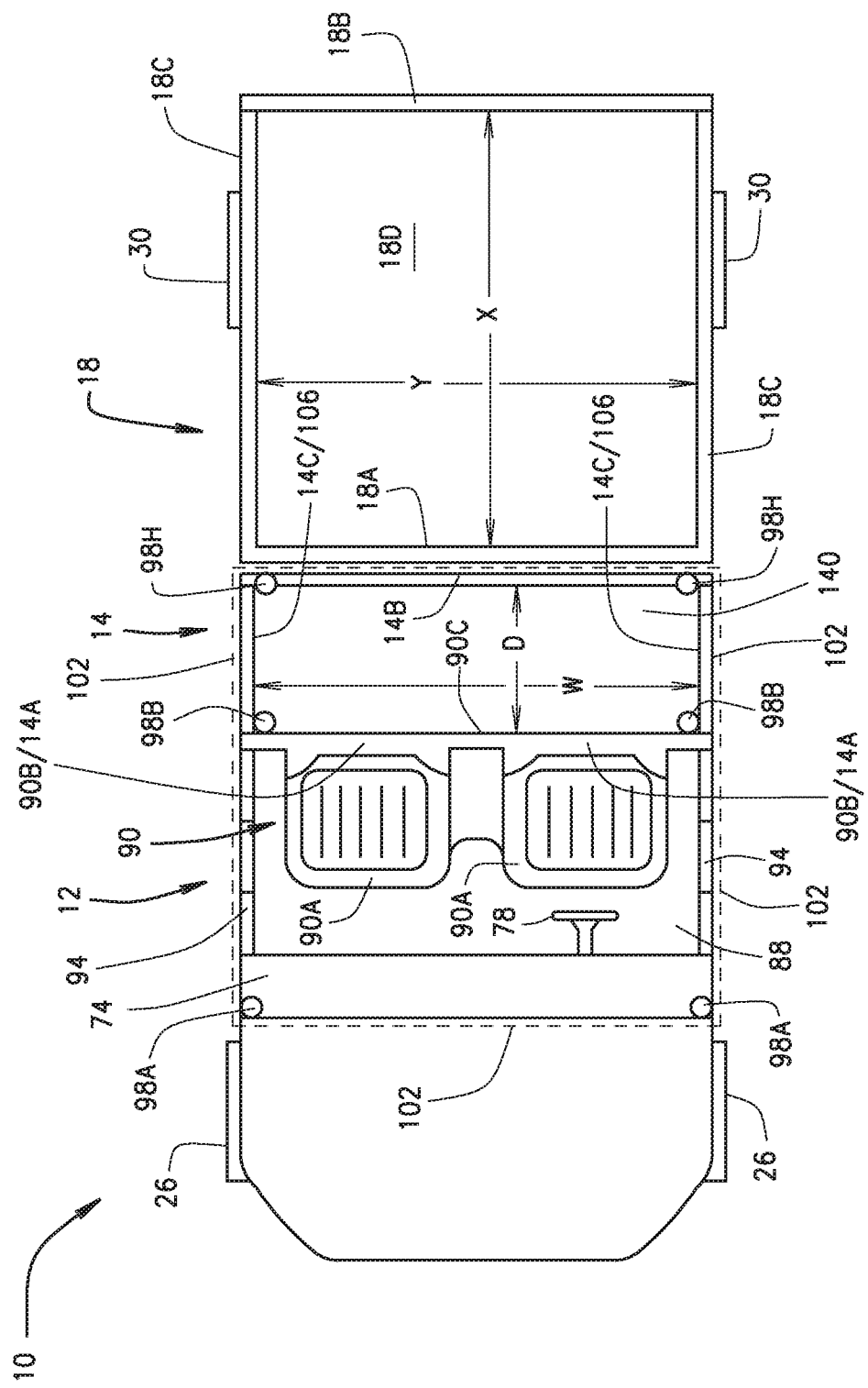
FIG. 5 is a schematic of a top view of the vehicle shown in FIG. 1 having a roof structure shown in phantom so that the passenger compartment and the auxiliary storage compartment can be more clearly shown, in accordance with various embodiments of the present disclosure.
Figure 15:
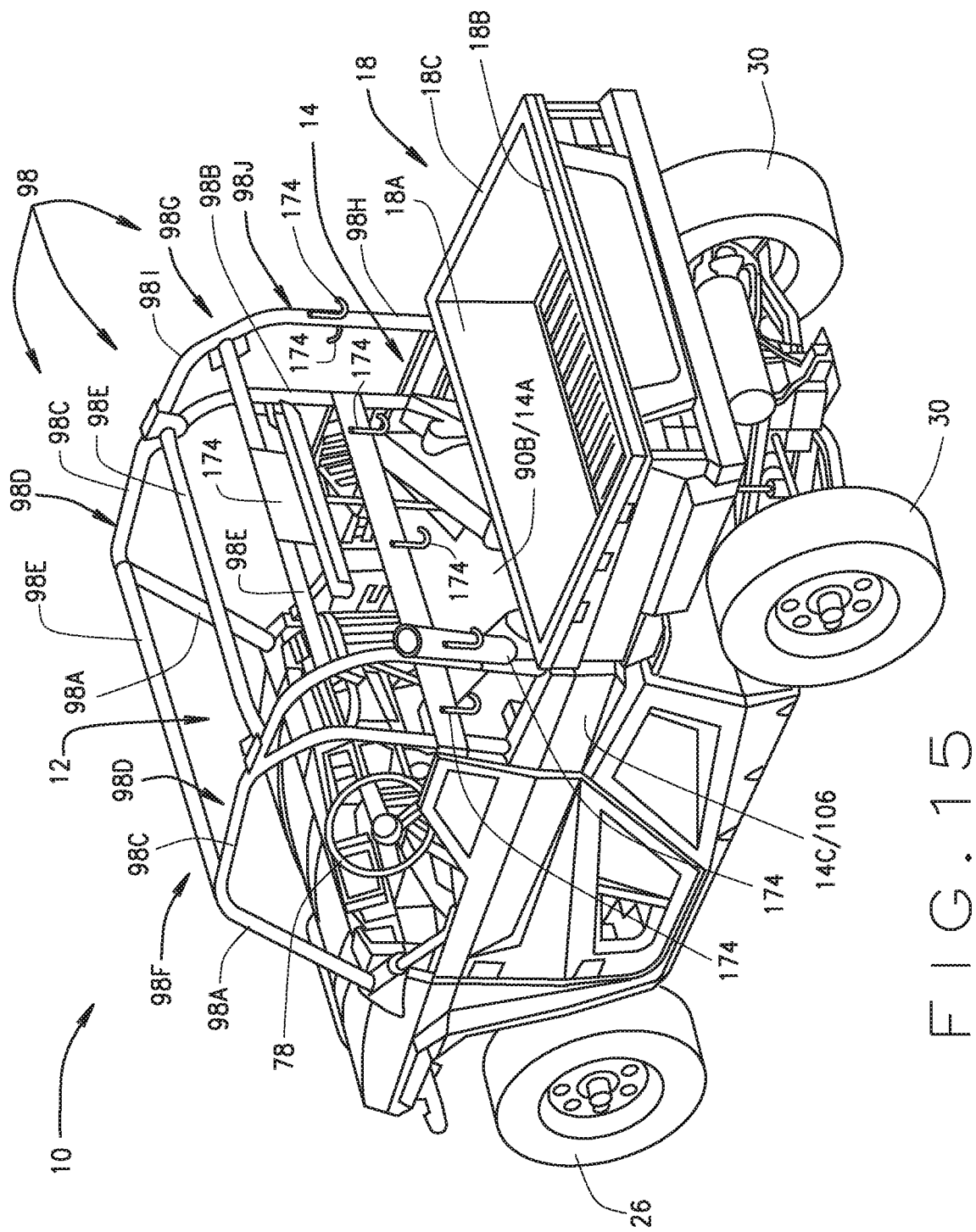
FIG. 15 is an isometric rear view of the vehicle shown in FIG. 1, wherein various vehicle accessories are mounted to various portions of a rollover protection system of the vehicle, in accordance with various embodiments of the present disclosure.

With particular reference to FIGS. 1, 5 and 15, the ROPS 98 generally includes one or more front uprights 98A extending upward from the front of the passenger compartment 12, e.g., beside or forward of the dash console 74, one or more rear uprights 98B extending upward from the rear of the passenger compartment 12 (or front of the auxiliary storage compartment 14), e.g., beside or immediately behind the seat back(s) 90B, and at least one or more overhead supports 98C that extend between and connect to the respective front and back uprights 98A and 98B. A respective one front uprights 98A, one rear upright 98B, and one overhead support 98C are connected, joined or integrally formed to provide a single ROPS truss, generally indicated in FIG. 15 as 98D. In various implementations, a respective one front upright 98A, rear upright 98B, and overhead support 98C can be individual structures that are joined or connected (e.g., welded, bolted, etc., together) to form a respective truss 98D of ROPS 98. Additionally or alternatively, in various implementations, a respective one front upright 98A, rear upright 98B, and overhead support 98C can be integrally formed (e.g., extruded, cast etc.) to form a respective truss 98D of ROPS 98. Two or more ROPS trusses 98D can be connected or joined via one or more crossbar 98E to form a passenger compartment cage of the ROPS 98 that surrounds (e.g., extends above, over and around) and protects the passenger compartment 12, generally indicated in FIG. 15 as 98F. In various embodiments, the trusses 98D can be joined or connected via the crossbar(s) 98E (e.g., welded, bolted, etc., together) to form the passenger compartment cage 98F. Additionally or alternatively, in various implementations, the trusses 98D can be integrally formed with the crossbar(s) 98E (e.g., extruded, cast, etc.) to form a respective passenger compartment cage 98E. In various implementations, at least a portion of a roof structure 102 (described below) can be connected or mounted to the overhead supports(s) 98C, and/or crossbar(s) 98E, and/or uprights 98A and 98B.

In various embodiments, in addition to the passenger compartment cage 98F, the ROPS 98 can include an auxiliary storage compartment cage, generally indicated in FIG. 15 as 98G, that can be connected to, or integrally formed with, the passenger compartment cage 98F. In various implementations, the auxiliary storage compartment cage 98G comprises one or more auxiliary uprights 98H extending upward from the rear of the auxiliary storage compartment 14, e.g., immediately in front of, immediately behind, or adjacent the ends of a back wall 14B of the auxiliary storage compartment 14 (described below), and one or more connecting supports 98I that extend between the auxiliary upright(s) 98H and the passenger compartment cage 98F. The connecting support(s) 98I can be connected to the rear upright(s) 98B and/or the overhead support(s) 98C. In various implementations, a respective one auxiliary upright 98H and connecting support 98I can be individual structures that are joined or connected (e.g., welded, bolted, etc.) together, to form a respective auxiliary arm 98J of ROPS 98. Additionally or alternatively, in various implementations, a respective one auxiliary upright 98H and connecting support 98I can be integrally formed (e.g., extruded, cast, etc.) to form a respective auxiliary arm 98J of ROPS 98. Two or more ROPS auxiliary arms 98J can be connected or joined via one or more crossbar 98E to form the auxiliary storage compartment cage 98G of the ROPS 98 that surrounds (e.g., extends above, over and around) and protects the auxiliary storage compartment 12.

The auxiliary storage compartment cage 98G is structured and operable to extend the ROPS 98 above, over and around the auxiliary storage compartment 14. As described above, the auxiliary storage compartment cage 98G can be connected to (e.g., welded, bolted, etc.) or integrally formed with (e.g., extruded, cast, etc.) with the passenger compartment cage 98F to provide the extended ROPS 98. As described above, in various embodiments, the vehicle 10 includes the roof structure 102 that can be mounted to the ROPS 98 to protect the passenger compartment 12, particularly passengers within the passenger compartment 12, from environmental elements such as sun, rain, sleet, snow, etc. Moreover, in various embodiments, the roof structure 102 can be sized and shaped to be mounted to the extended ROPS 98 (the extending ROPS 98 comprising the combination of the passenger compartment cage 98F and auxiliary storage compartment cage 98G) such that the roof structure 102 is disposed over the passenger compartment 12 and the auxiliary storage compartment 14. Therefore, in addition to the passenger compartment 12, the auxiliary storage compartment 14, particularly, items within the auxiliary storage compartment 14, are covered and protected from environmental elements by the roof structure 102. In such embodiments, the roof structure 102 can be connected or mounted to the overhead supports(s) 98C, and/or crossbar(s) 98E and/or uprights 98A, 98B and 98H, and/or connecting support(s) 98I.

It will be appreciated, however, that in alternative embodiments, the roof structure 102 may be sized and shaped such that the roof structure 102 may be disposed only over the passenger compartment 12 (or portion thereof) or only over the auxiliary storage compartment 14 (or portion thereof). In some embodiments, the roof structure 102 may comprise a plurality of modular pieces that may be selectably mounted to the ROPS 98 to cover a desired portion(s) of the passenger compartment 12 and/or auxiliary storage compartment 14. For example, in some such embodiments, a first modular piece of the roof structure 102 may be selectably mounted to the ROPS 98 to cover the passenger compartment 12 and a second modular piece of the roof structure 102 may be selectably mounted to the ROPS 98 to cover the auxiliary storage compartment 14.

As best illustrated in FIG. 5, as described above, the cargo bed 18 is mounted to the chassis 22 and is structured and operable to hold various payloads such as gravel, rock, soil, debris, garbage, wood, etc., and/or larger tools and equipment such as shovels, rakes, wheelbarrows, lawn mowers, chain saws, other motorized equipment, etc. By contrast, the auxiliary storage compartment 14 is structured and operable to stow such things as backpacks, duffle bags, sleeping bags, smaller and/or more fragile camping equipment, rifles, handguns, bows, hand tools, etc. As also described above, the auxiliary storage compartment 14 is autonomous and independent structure. More specifically, the auxiliary storage compartment 14, is independent, separate and distinct from the cargo bed 18. As described above, the auxiliary storage compartment 14 comprises the front wall 14A provided by the seat back(s) 90B and defined by the back side 90C of the passenger seating structure 90. It is envisioned that in various embodiments, the front wall 14A can be an intermediate panel, partition or other structure that is independent, separate and distinct from seat back(s) 90B. In such embodiments, the independent, separate and distinct panel, partition or other structure providing the front wall 14A can be disposed laterally between the sidewalls 14C immediately behind the seat back(s) 90B such that it is adjacent to the back side 90C of the seat back(s) 90B. It is envisioned that such an intermediate panel, partition or other structure can be in contact with and/or mounted to the back side 90C, or can be spaced apart from the back side 90C such that there is a gap therebetween. The auxiliary storage compartment 14 additionally comprises a back wall 14B that is disposed laterally between the sidewalls 14C in front of a front panel 18A of the cargo bed 18. More specifically, the auxiliary storage compartment back wall 14B is independent, separate and distinct from the cargo bed front panel 18A, and is disposed longitudinally (with regard to a longitudinal axis of the vehicle 10) in front of the cargo bed front panel 18A. The auxiliary storage compartment 14 further comprises a pair of opposing sidewalls 14C that connect the front and back walls 14A and 14B, and a floor 14D disposed between the front wall, back wall and sidewalls 14A, 14B and 14C.

Figure 6:
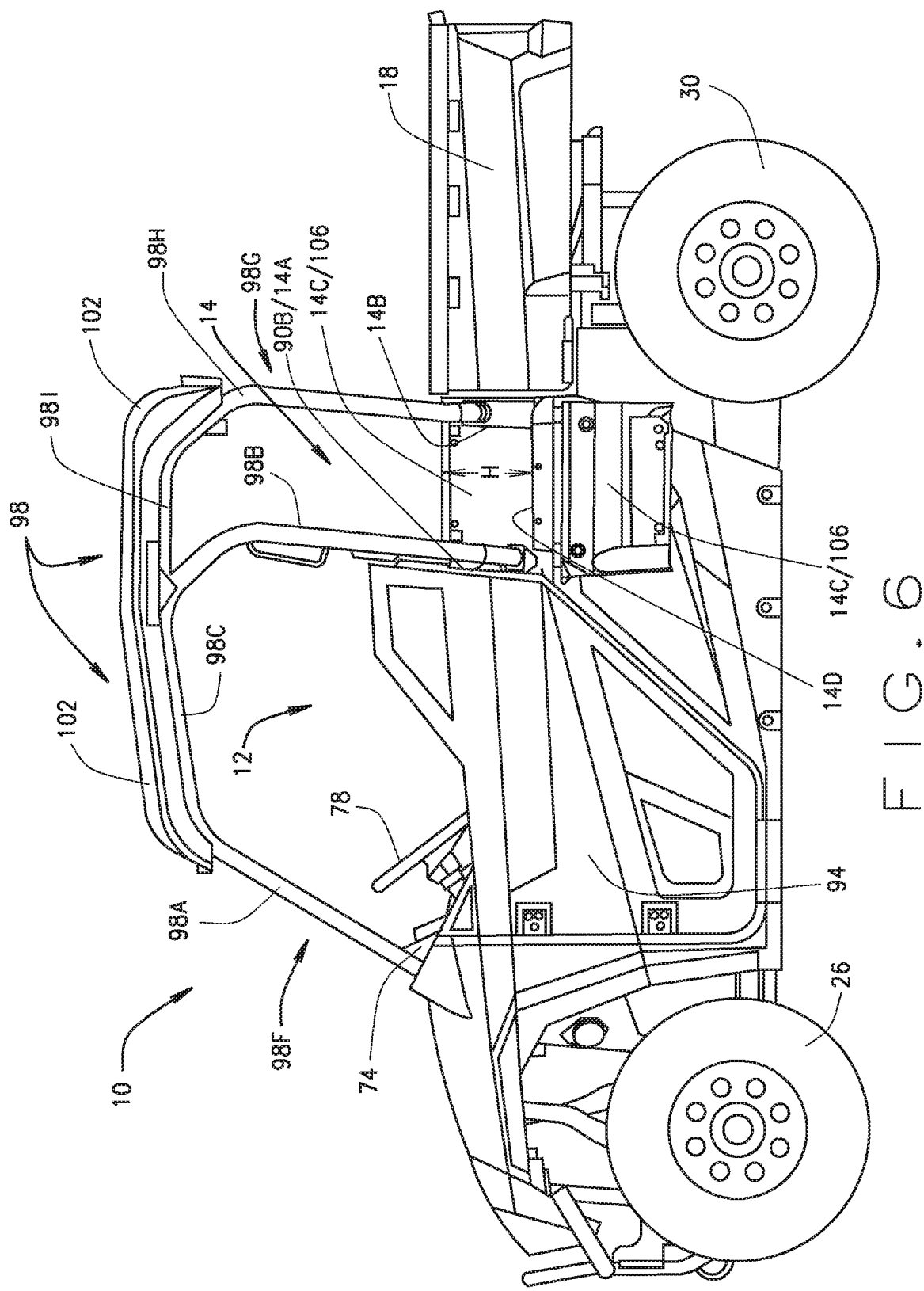
FIG. 6 is a side view of the vehicle shown in FIG. 1, having an access door of the auxiliary storage compartment swung down to an Open position, in accordance with various embodiments of the present disclosure.

The auxiliary storage compartment 14 can have any desired dimensions and interior volume. By way of non-limiting example, in various embodiments, the auxiliary storage compartment can have a width W substantially equal to a width of the passenger compartment 90 (e.g., approximately 5 feet), a length or depth D of approximately 12, 14, 16, 18 or more inches, and a height H of 12, 14, 16, 18 or more inches (FIG. 6). It will be appreciated, however, that the depth D and the height H of the auxiliary storage compartment 14 can be selected to provide any desired amount of space within the scope of the disclosure. Additionally, in various embodiments, the cargo bed 18 is a fixed dimension, 'full-size' bed. That is, a length X of the cargo bed 18 is fixed (e.g., approximately 5 feet long), a width Y is fixed (e.g. approximately 5 feet wide), and a depth Z is fixed (e.g., approximately 18 inches deep) (FIG. 3). In various embodiments, the cargo bed is structured to hold 600-1000 pounds of cargo. Furthermore, in various embodiments, in order to accommodate the cargo bed 18 and the autonomous, independent auxiliary compartment 14, the chassis 22 of the vehicle 10 is fabricated, formed or structured to have an extended length, relative to vehicles that do not include an autonomous, independent auxiliary compartment, such as the autonomous and independent auxiliary compartment 14 described herein. Additionally, in various embodiments, the auxiliary storage compartment is structured to hold 300 pounds or more of personal gear, hand tools and/or other items that the vehicle operator may find undesirable to stow in a cargo bed 18.

In various embodiments, the cargo bed comprises the front panel 18A that is independent, separate and distinct from the auxiliary storage compartment rear wall 14B, a rear panel 18B a pair of opposing side panels 18C that connect at least one of the front and rear panels 18A and 18B, and a deck 18D. In various embodiments, the rear panel 18B can be a tailgate structured and operable to Open and Close to provide access to the cargo area defined by the front panel 18A, side panels 18C, rear panel/tailgate 18B and deck 18D. It is envisioned that in various embodiments, the auxiliary storage compartment 14 and cargo bed 18 can share a common wall. That is, in various embodiments, the auxiliary storage compartment back wall 14B can also be, define and function as the front panel 18A of the cargo bed. Or, alternatively, in various embodiments, the cargo bed front panel 18A can also be, define and function as the back wall 14B of the auxiliary storage 14.

Referring now to FIGS. 1 and 6, in various embodiments, at least one of the auxiliary storage compartment sidewalls 14C comprises an access door 106 that is movable between a Closed position (shown in FIG. 1), wherein the closed access door 106 defines the respective sidewall 14C, and an Open position (shown in FIG. 6), wherein access to the auxiliary storage compartment 14 is provided via the open access door 106. In various implementations, each access door 106 can be hingedly connected at a bottom edge of the respective access door 106 to the floor 14D of the auxiliary storage compartment 14 or any other suitable vehicle structure of vehicle 10 adjacent the floor 14D. Accordingly, when moved from the Closed position to the Open position, the access door 106 pivots about the bottom edge such that a top edge of the access door 106 swings away from the auxiliary storage compartment 14 and downward, as illustrated by way of example in FIG. 6. Additionally or alternatively, in various other embodiments, each access door can be hingedly connected along a side edge of the respective access door 106 to either the front wall 14A or the back wall 14B or any other suitable vehicle structure adjacent the front or back wall 14A or 14B. Accordingly, when moved from the Closed position to the Open position, the access door 106 pivots about the respective hingedly connected side edge such that the opposing side edge swings away from the auxiliary storage compartment and toward the front or the rear of the vehicle 10.

Figure 7:
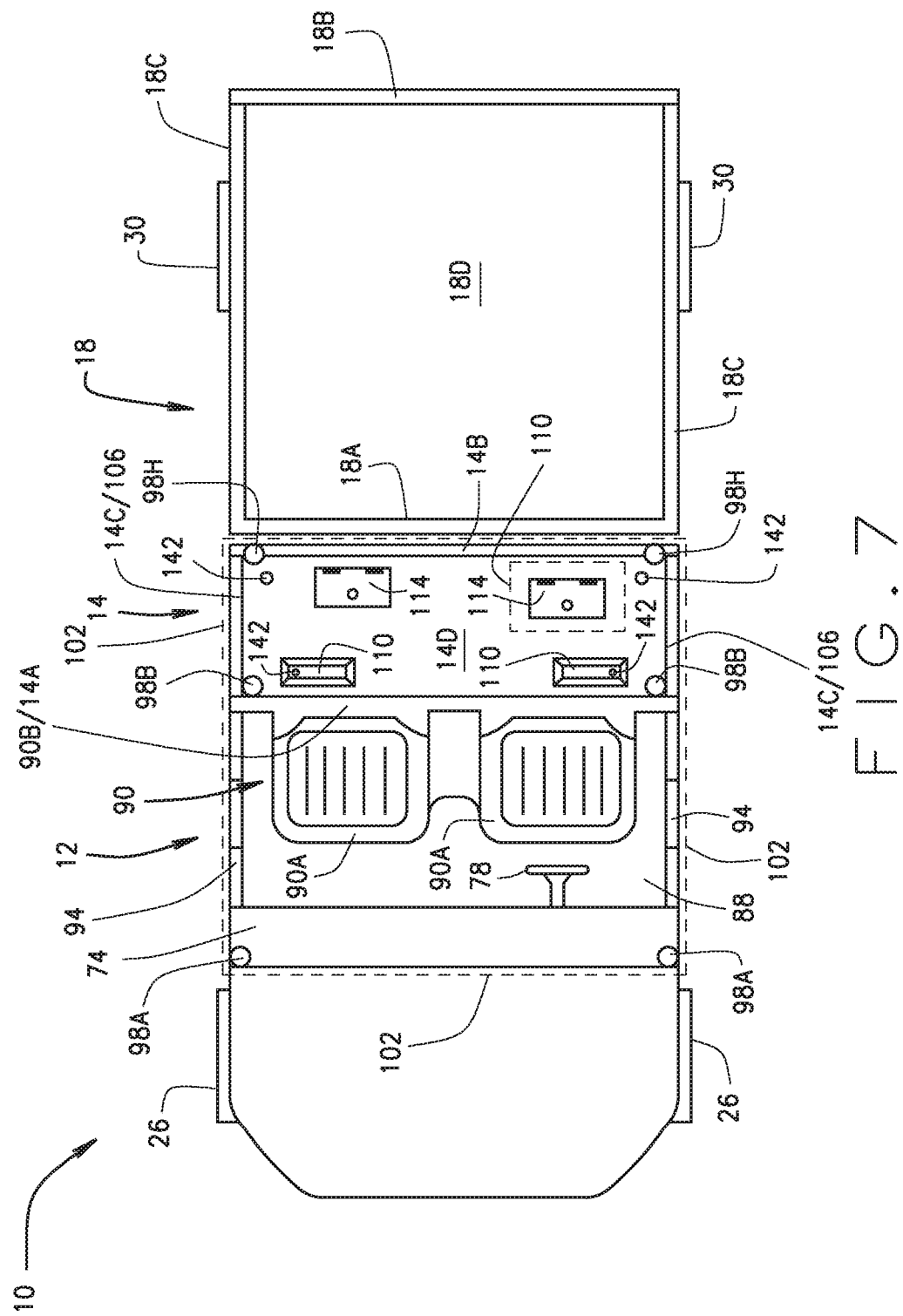
FIG. 7 is a schematic of a top view of the vehicle shown in FIG. 1, wherein the auxiliary storage compartment includes at least one stowage well and/or at least one access panel, in accordance with various embodiments of the present disclosure.

Referring now to FIG. 7, in various embodiments, the auxiliary storage compartment 14 can include at least one stowage well 110 disposed within the floor 14D. Each stowage well 110 can have any desired shape, size and volume, and is structured and operable to stow at least one operator article such as one or more rifle (e.g., the butt of one or more rifle can be disposed within the stowage well 110), one or more handgun, one or more hand tool, one or more toolbox (e.g., a toolbox sized and shaped to have exterior dimension substantially the same as interior dimensions of the respective stowage well 110 such that the toolbox can be disposed within stowage well 110), etc.

Additionally, in various embodiments, the auxiliary storage compartment 14 can include at least one access panel 114 disposed within a matingly sized opening in the floor 14D (not shown). At least one access panel 114 forms a portion of the floor 14D to thereby provide usable floor surface area. Each access panel 114 is structured and operable to be opened or removed to allow access, via the respective opening, to at least one component, device, system, assembly, etc., (e.g., oil filter, oil level indicator, oil fill port, air filter, fuel filter, battery power outlet and/or recharge port, pneumatic or hydraulic bed lift motor, etc.) of the vehicle 10 that is disposed beneath or under the auxiliary storage compartment floor 14D. In various embodiments, one or more access panel 114 can be hingedly connected to the floor 14D such that the access panel(s) 114 can be pivoted about the hinged connection to be moved between a Closed and Open position. Additionally or alternatively, in various embodiments, one or more access panel 114 can be removably disposed within the opening in the floor 14 such that the access panel(s) 114 can be removed to access the component, device, system, assembly, etc., disposed beneath or under the auxiliary storage compartment floor 14D, and redisposed within the opening in the floor 14 to replace the access panel(s) 114. In various implementations, the access panel(s) 114 can be structured and operable to provide a substantially water-tight seal when closed such that water, moisture, condensation, etc., will not drip or flow into the area beneath the respective access panel(s) 114.

In various other implementations, one or more stowage well 110 can additionally include an access panel 114 covering the respective stowage well 11. Accordingly, operator article(s) can be stowed within the stowage well(s) 110 and then concealed by the respective access panel 114. Additionally, as described above, one or more access panel 114 forms a portion of the floor 14D to thereby provide additional usable floor surface area. Also, as described above, in various implementations, the access panel(s) 114 can be structured and operable to provide a substantially water-tight seal when closed such that water, moisture, condensation, etc., will not drip or flow into the respective stowage well 110 and the contents therein will always remain dry. In such embodiments, the stowage well 110 can have any shape, size and interior volume. More specifically, any particular stowage well 110 can have interior dimensions that are larger than the respective access panel 114 and corresponding opening. It is envisioned that, in various embodiments, a stowage well can be sized and shaped to have a suitable vehicle jack, e.g., a high lift off-road style jack, disposed therein.

Also, it is envisioned that in various embodiments, any stowage well 110, whether including an access panel 114, or not, can be constructed to be thermally insulating such that heat from any vehicle components disposed beneath the auxiliary storage compartment 14 will not heat, affect, or damage any items stowed in the respective stowage well 114. Furthermore, it is envisioned that in various embodiments, any stowage well 114 can be constructed to be thermally insulating so as to provide a 'built in' cooler usable to keep items, e.g., beverages and food, cold. Still further, in various embodiments, any stowage well 110 can include one or more drainage holes 142 structured and operable to allow any water, moisture, condensation, etc., that may enter or form within the respective stowage well 110 to drain out and not collect and/or puddle within the respective stowage well 110. In such embodiments, a drain tube (not shown) can be connected to one or more drain hole 142 to direct and/or carry drainage to a vehicle exterior location, away from components of the vehicle 10.

Similarly, in various embodiments, the floor 14D can include one or more drainage hole 142 structured and operable to allow any water, moisture, condensation, etc., that may enter or form within the auxiliary storage compartment 14 to drain out and not collect and/or puddle therein. In such embodiments, a drain tube (not shown) can be connected to one or more drain hole 142 to direct and/or carry drainage to a vehicle exterior location, away from components of the vehicle 10.

Figure 8:
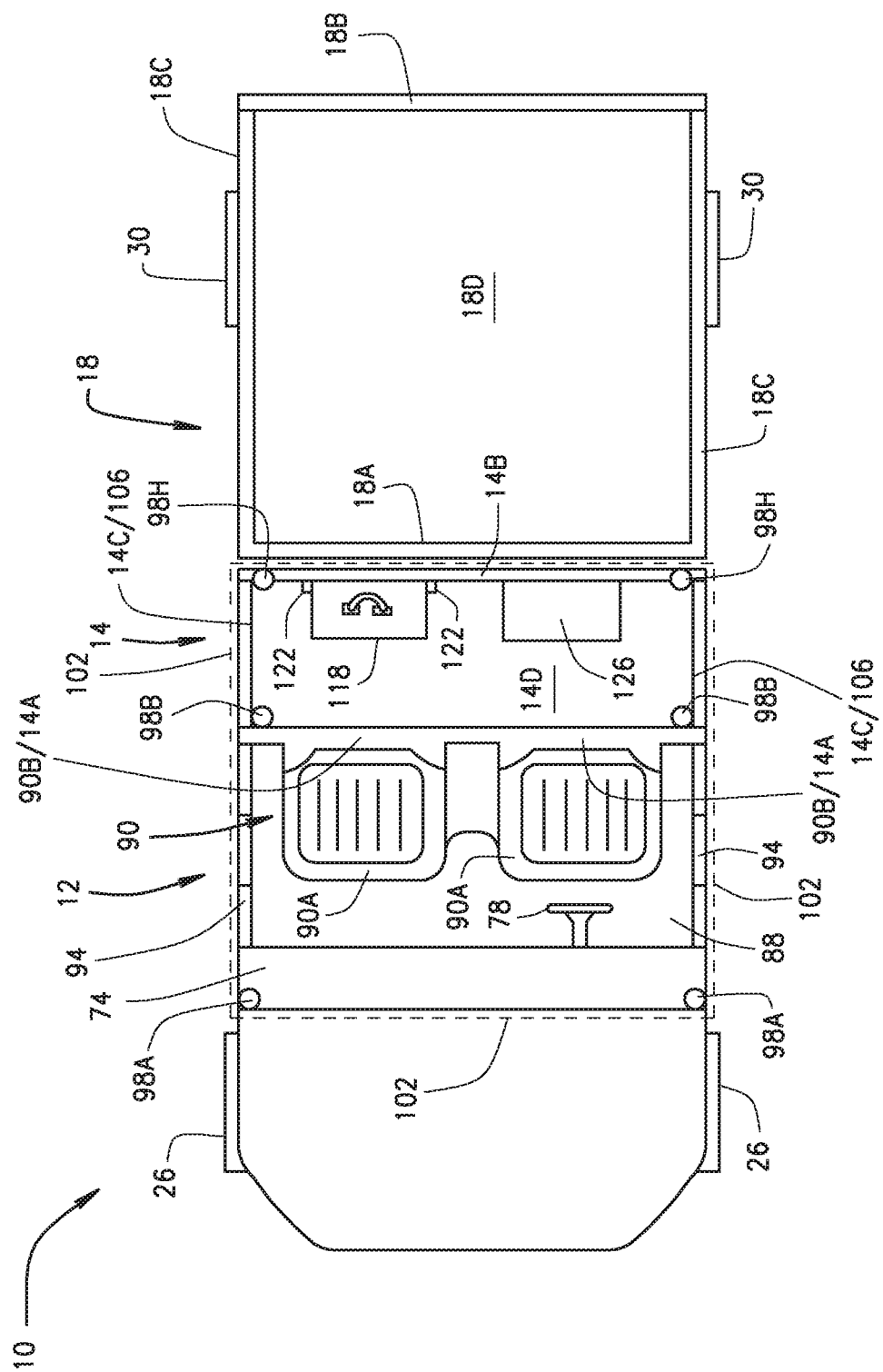
FIG. 8 is a schematic of a top view of the vehicle shown in FIG. 1, wherein the auxiliary storage compartment includes at least one accessory cargo box, in accordance with various embodiments of the present disclosure.

Referring now to FIG. 8, in various embodiments, the auxiliary storage compartment 14 can include at least one accessory cargo box 118 that is removably retainable within or connectable to at least one of the auxiliary storage compartment floor 14D, front wall 14A, sidewalls/access doors 14C/106 and/or back wall 14B. Each accessory cargo box 118 is structured and operable to retain one or more operator accessory such as hand tool(s), camping utensil(s), small camping equipment, handgun(s), rifle and/or handgun ammunition, etc.

In various implementations, the accessory cargo box(es) 118 can be connectable to at least one of the floor 14D, front wall 14A, sidewalls/access doors 14C/106 and/or back wall 14B via one or more latching system 122 fixed/mounted/connected to the respective floor 14D, front wall 14A, sidewall/access door 14C/106 and/or back wall 14B. More particularly, in such implementations, each latching system 122 includes a first connector fixed/mounted/connected to, or integrally formed within, the respective floor 14D, front wall 14A, sidewall/access door 14C/106 and/or back wall 14B and at least one second connector fixed/mounted/connected to the respective accessory cargo box 118, wherein the first and second connectors are engageable with, or connectable to, each other.

Each latching system 122 can be any suitable latching, fastening or connecting system, device or component. For example, in various embodiments, one or more latching system can comprise: 1) a tab or cargo box fixture having a first elongated, or winged, hole therethrough, one or more corresponding second elongated, or winged, holes in the respective floor 14D, front wall 14A, sidewall/access door 14C/106 and/or back wall 14B, and a spring loaded T-shaped key or pin that can be inserted through the aligned first and second holes and turned, e.g., ¼ to ¾ turn, to engage the T-shaped key or pin with a back side of the respective second hole and a top side of the respective first hole; 2) a tab with a hole fixed to the respective accessory cargo box 118, a bolt insertable through the hole and threadable into a treaded receiver fixed to the respective floor 14D, front wall 14A, sidewall/access door 14C/106 and/or back wall 14B; 3) a rotatable or pivotable latch mounted to the respective floor 14D, front wall 14A, sidewall/access door 14C/106 and/or back wall 14B and a latch receiver fixed to the respective accessory cargo box 118; 4) a clevis mounted to the respective floor 14D, front wall 14A, sidewall/access door 14C/106 and/or back wall 14B, a tab with an aperture fixed to the respective accessory cargo box 118 and a clevis pin insertable through the clevis and apertured tab; 5) a pair of hooks, rings, or cleats mounted to the respective floor 14D, front wall 14A, sidewall/access door 14C/106 and/or back wall 14B, and an elastic strap, bungee cord, metal strap or cord disposable around the respective accessory cargo box 118 and connectable at opposing end to the hooks, rings, or cleats; 6) or any other suitable latching system or fixture.

It is envisioned that the cargo box(es) 118 can have any size and shape, for example, the cargo box(es) 118 can be sized and shaped to fit with one or more recessed docking well 126 (as described above); sized and shaped to 'form fit' within any area of the auxiliary storage compartment 14 and attached to the respective floor 14D, front wall 14A, sidewall/access door 14C/106 and/or back wall 14B, via one or more latching system 122 (as described above); sized and shaped to extend across substantially the entire width W and/or depth D and attached to the respective floor 14D, front wall 14A, sidewall/access door 14C/106 and/or back wall 14B, via one or more latching system 122 (as described above); etc.

Additionally or alternatively, in various implementations, the accessory cargo box(es) 11 can be retainable within a recess formed in the auxiliary storage compartment 14. More particularly, in such implementations, the auxiliary storage compartment 14 comprises one or more recessed docking wells 126 formed within the floor 14D. In various implementations, each recessed docking well 126 can be sized and shaped to have interior dimensions that approximately match the size and shape (e.g., the exterior dimensions) of the bottom of the respective accessory cargo box 118, and to have depth sufficient to retain the respective accessory cargo box 118 without the accessory cargo box 118 becoming easily dislodged due to motion of the vehicle 10. Accordingly, the respective accessory cargo box(es) 118 can be inserted into the respective docking well 126, such that the cargo box(es) 118 nest(s) within the respective docking well(s) 126, much like a cup into a cup holder, to substantially secure the cargo box 118 within the auxiliary storage compartment 14. Conversely, the respective cargo box(es) 118 can be easily lifted out of the docking well(s) 126 and removed from the auxiliary storage compartment 14.

In various other embodiments, the docking well(s) 126 can be sized and shaped to receive and retain other suitable accessories such as a cooler, a gas can, a water jug/bottle/cooler, an auxiliary battery, an air compressor, etc. Additionally or alternatively, in various embodiments, similarly to the cargo box(es) 118, other accessories such as a cooler, a gas can, a water jug/bottle/cooler, an auxiliary battery, an air compressor, etc. can be secured within the auxiliary storage compartment 14 using one or more latching system 122, as described above.

Figure 9:
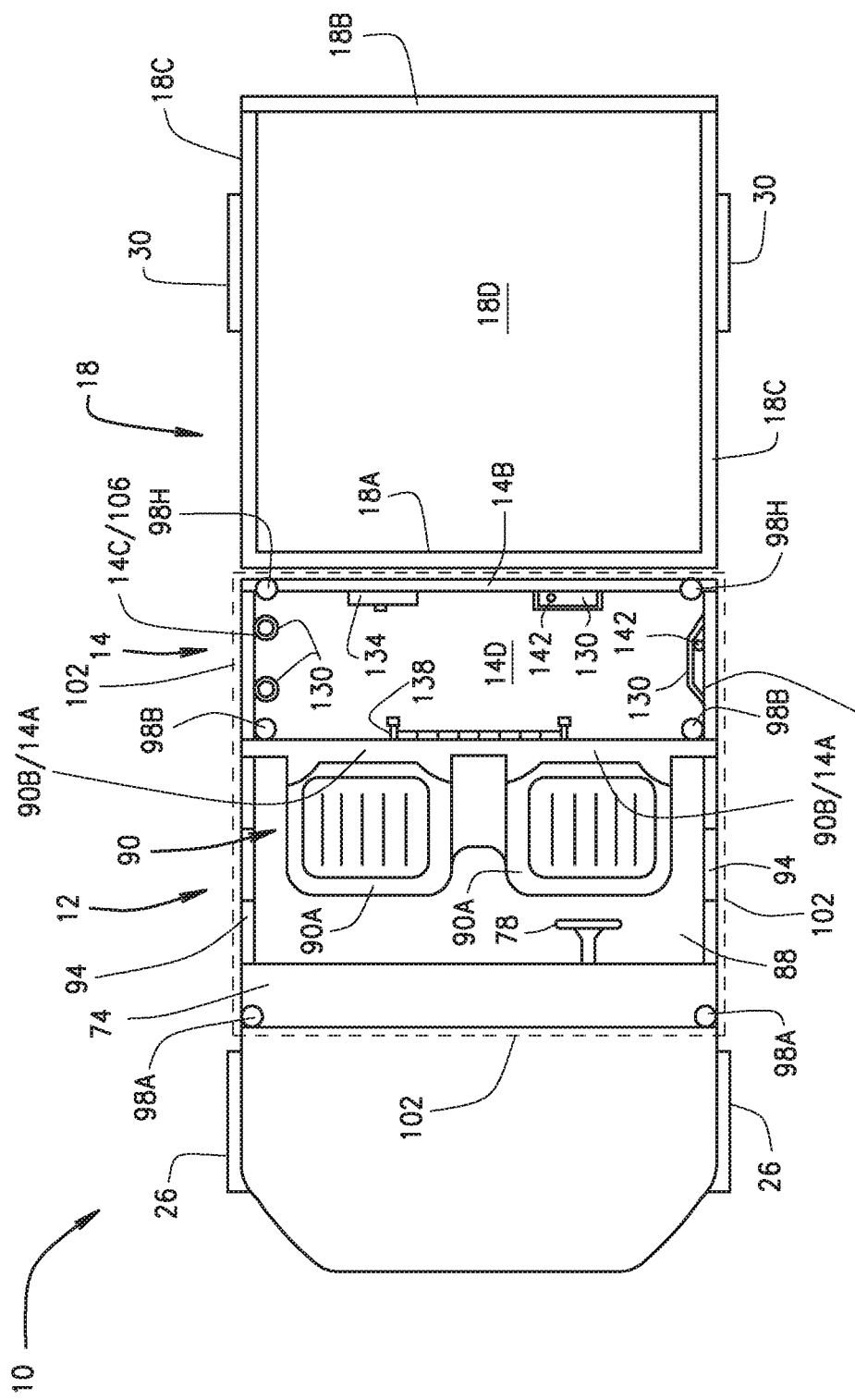
FIG. 9 is a schematic of a top view of the vehicle shown in FIG. 1, wherein the auxiliary storage compartment includes one or more storage pockets and/or storage boxes, in accordance with various embodiments of the present disclosure.

Referring now to FIG. 9, in various embodiments, at least one of the front wall 14A, sidewalls/access doors 14C/106 and/or back wall 14B can included one or more open storage pockets 130 and/or closable storage boxes 134 and/or storage racks 138 integrally formed therewith or mounted thereto. The storage pocket(s) 130 and storage box(es) 134 are structured and operable to hold and retain suitably sized operator accessories such as a first aid kit, a foldable shovel, a tape measure, a carpenter's level, a hammer, an axe, other hand tools, a rifle, a handgun, folded rain gear, a safety kit, an adventure kit etc. The storage pocket(s) 130 can be fabricated of a molded material, such as plastic, fiberglass, polycarbonate, etc., to have a preformed shape, or the storage pocket(s) 130 can be fabricated of a flexible material such as canvas or other durable flexible material. Moreover, the storage box(es) 134 each include a lid to cover and protect whatever is placed inside. In various embodiments, the storage box lid(s) can be structured and operable to provide a substantially water-tight seal when closed such that the contents will always remain dry.

Additionally, the storage pockets 130 can be sized and shaped to be substantially the same size and shape as a particular tool, box, or accessory such that the respective tool, box or accessory can be nested within the respective storage pocket 130, as described above with regard to the cargo box(es) 118 and docking well(s) 126. It is envisioned that, in various implementations, the open storage pocket(s) 130 and/or closable storage box(es) 134 and/or storage rack(s) 138 can not only be used for storage, but also as fastening points for rope and/or elastic strap tie downs. It is further envisioned that, in various embodiments, the open storage pocket(s) 130 and/or closable storage box(es) 134 and/or storage rack(s) 138 can include one or more latching system(s) 122 (as described above) disposed on the interior and/or exterior of the respective open storage pocket(s) 130 and/or closable storage box(es) 134 and/or storage rack(s) 138. Furthermore, in various embodiments, the open storage pocket(s) 130 and/or closable storage box(es) 134 can include one or more drainage hole 142 structured and operable to allow any water, moisture, condensation, etc., that may enter or form within the respective the storage pocket(s) 130 and/or storage box(es) 134 to drain out and not collect and/or puddle within the respective the storage pocket(s) 130 and/or storage box(es) 134. In such embodiments, a drain tube (not shown) can be connected to one or more drain hole 142 to direct and/or carry drainage to a vehicle exterior location, away from components of the vehicle 10.

Figure 10:
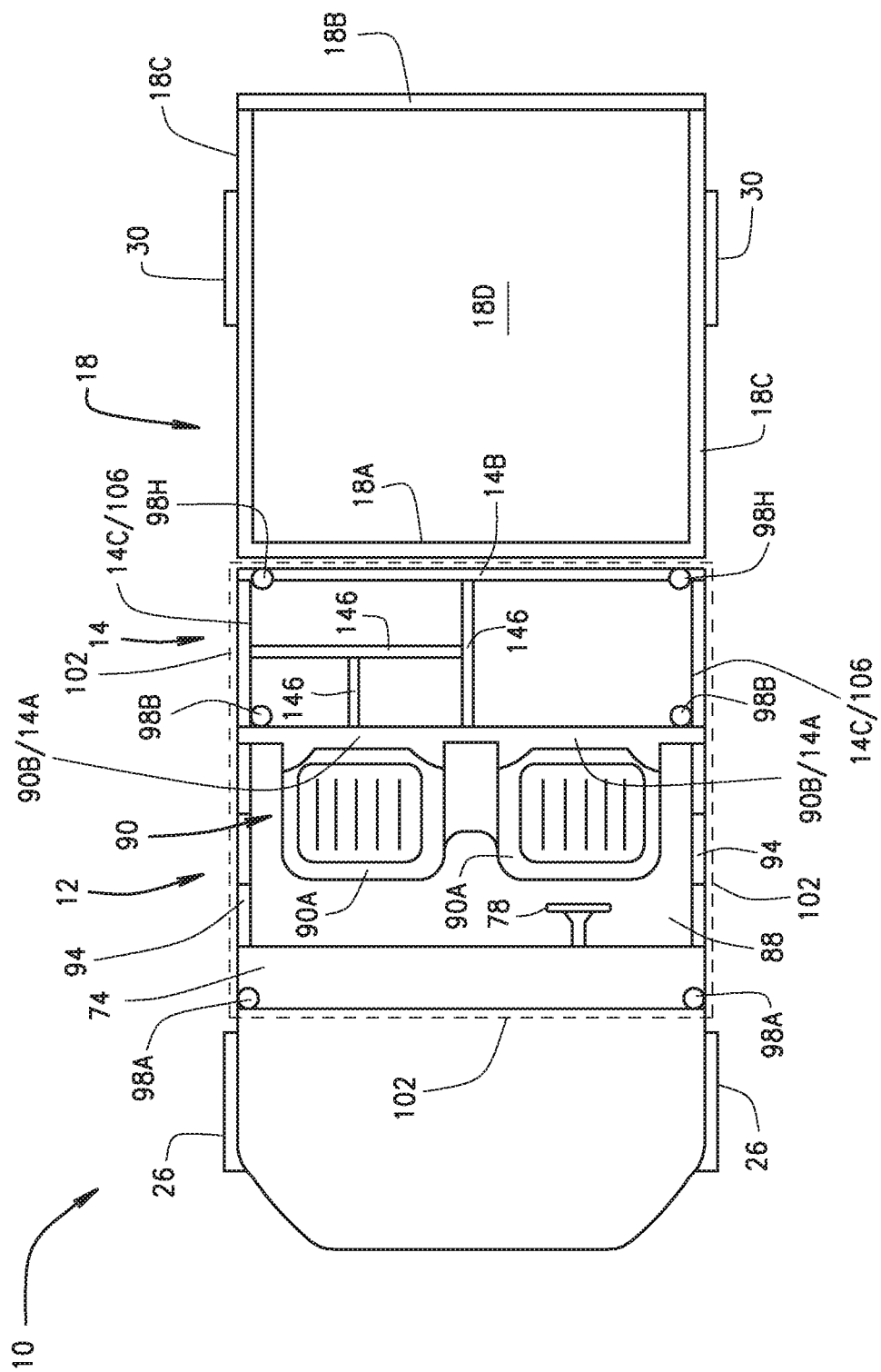
FIG. 10 is a schematic of a top view of the vehicle shown in FIG. 1, wherein the auxiliary storage compartment includes one or more divider partitions, in accordance with various embodiments of the present disclosure.

Referring now to FIG. 10, in various embodiments, the auxiliary storage compartment 14 can comprise one or more divider partitions 146 that are structured and operable to subdivide the auxiliary storage compartment 14 into smaller storage bins. In various implementations, the divider partitions 146 can be integrally formed with the front wall 14A, sidewalls/access doors 14C/106, back wall 14B and/or floor 14D. Additionally or alternatively, in various implementations, the divider partitions 146 can be removeably disposable within channels (not shown) formed within the front wall 14A, sidewalls/access doors 14C/106, back wall 14B and/or floor 14D, and/or channels (not shown) formed within one or more of the divider partitions 146. Therefore, the divider partitions 146 can be configured to form storage bins of various sizes and shapes. It is envisioned that each divider partition 146 can independently have any desired height, such that each divider partition 146 can independently have a height that is shorter than, substantially equal to, or taller than the height H of the auxiliary storage compartment 14 (FIG. 6). Accordingly, in various configurations, one or more divider partition 146 can have a height that is greater than, substantially equal to, or less than adjacent and/or connected divider partitions 146. Furthermore, the auxiliary storage compartment 14 can include, or include partition channels such that the auxiliary storage compartment 14 can be configured to include, any number of divider partitions 146 configured in any desired pattern.

Figure 11:
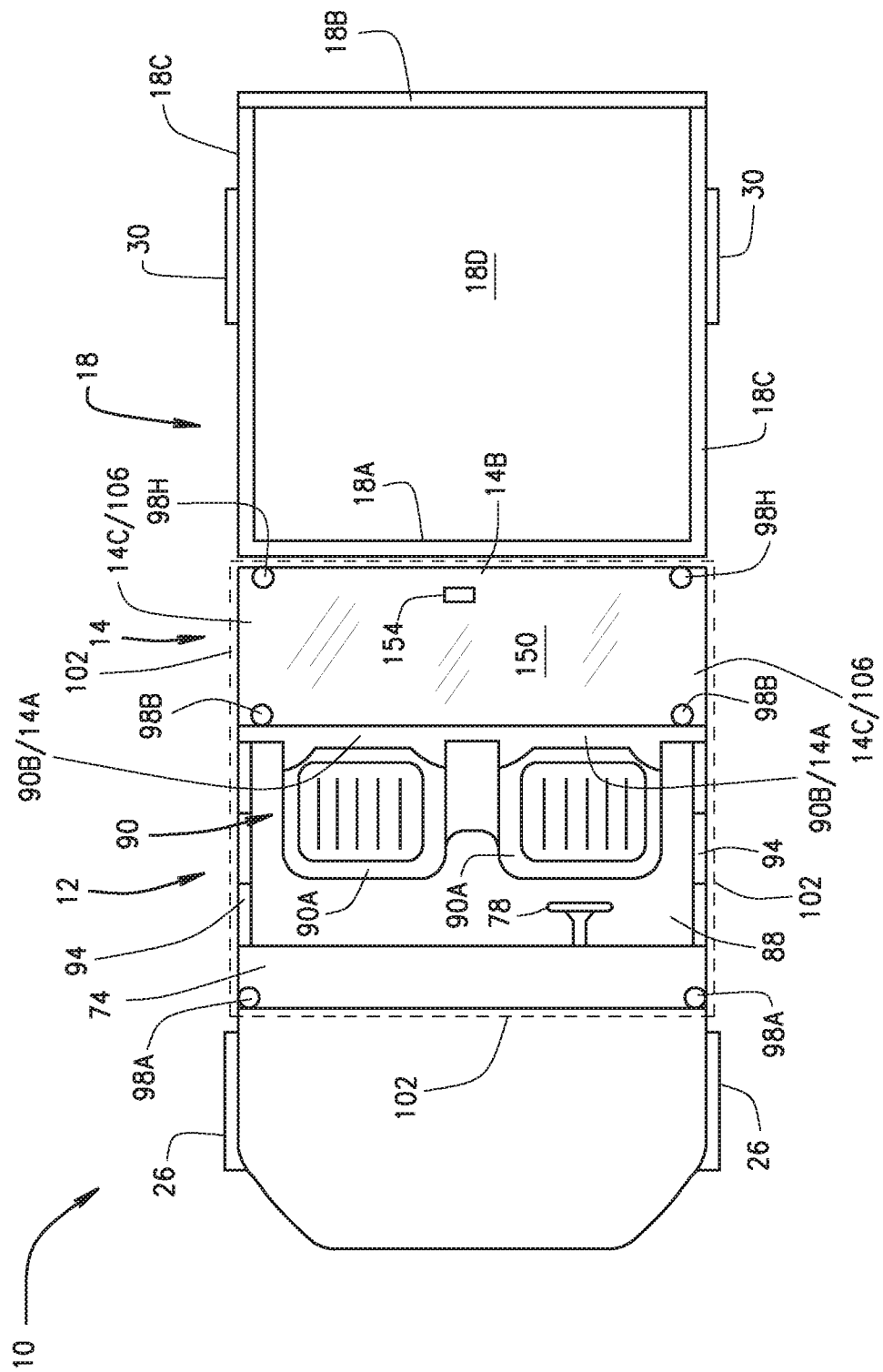
FIG. 11 is a schematic of a top view of the vehicle shown in FIG. 1, wherein the auxiliary storage compartment includes a hood, in accordance with various embodiments of the present disclosure.

Referring now to FIG. 11, in various embodiments, the auxiliary storage compartment 14 can include a hood 150, e.g., a cover, top or lid, that is structured and operable to cover and protect the interior space of the auxiliary storage compartment 14 and contents thereof. In the various embodiments, wherein the vehicle 10 includes the ROPS 98, as described herein, the hood 150 is disposed below the connecting supports 98I of the auxiliary storage compartment cage 98G. Additionally, the various embodiments wherein the vehicle 10 includes a roof structure 102 mounted to the ROPS 98, as described herein, the hood 105 is independent, separate and distinct from the roof structure 102. The hood 150 can be a single-piece structure or a multi-section structure. The hood 150 can be removably disposable over the auxiliary storage compartment 14, or hingedly connected to any one or more of the front wall 14A, sidewalls/access doors 14C/106, and/or back wall 14B such that the hood 150, or various sections thereof, can be removed and replaced, or raised and lowered between an Open position and Closed position. In various embodiments, the hood 150 can be structured and operable to provide a substantially water-tight seal when closed such that the interior space and the contents therein will remain dry. Additionally, in various embodiments, the hood 150 can include one or more lock 154 structured and operable to selectably lock the hood 150 in the Closed position.

In various embodiments, the hood 150 can be fabricated of a substantially hard, substantially rigid material such as metal, fiberglass, plastic, polycarbonate, or any other composite material. Additionally, or alternative, in various embodiments, the hood 150 can be fabricated of a flexible material such as canvas, vinyl, flexible plastic, etc. In such embodiments, the flexible hood 150 can include a zipper, buttons, snaps, hook-and-loop connector (e.g., Velcro®), or other suitable connector disposed along a periphery of the hood 150, whereby the hood 150 can be held in the Closed position. Additionally, in such embodiments, the flexible hood 150 can comprise a tonneau cover that includes a biased retracting roller mounted to one of the front wall 14A, sidewalls/access doors 14C/106, and/or back wall 14B, and the flexible material is connect such that the flexible material can be retracted onto the biased roller (in the Open position) and extended therefrom (in the Closed position) in the same manner as a roller shade.

Figure 12:
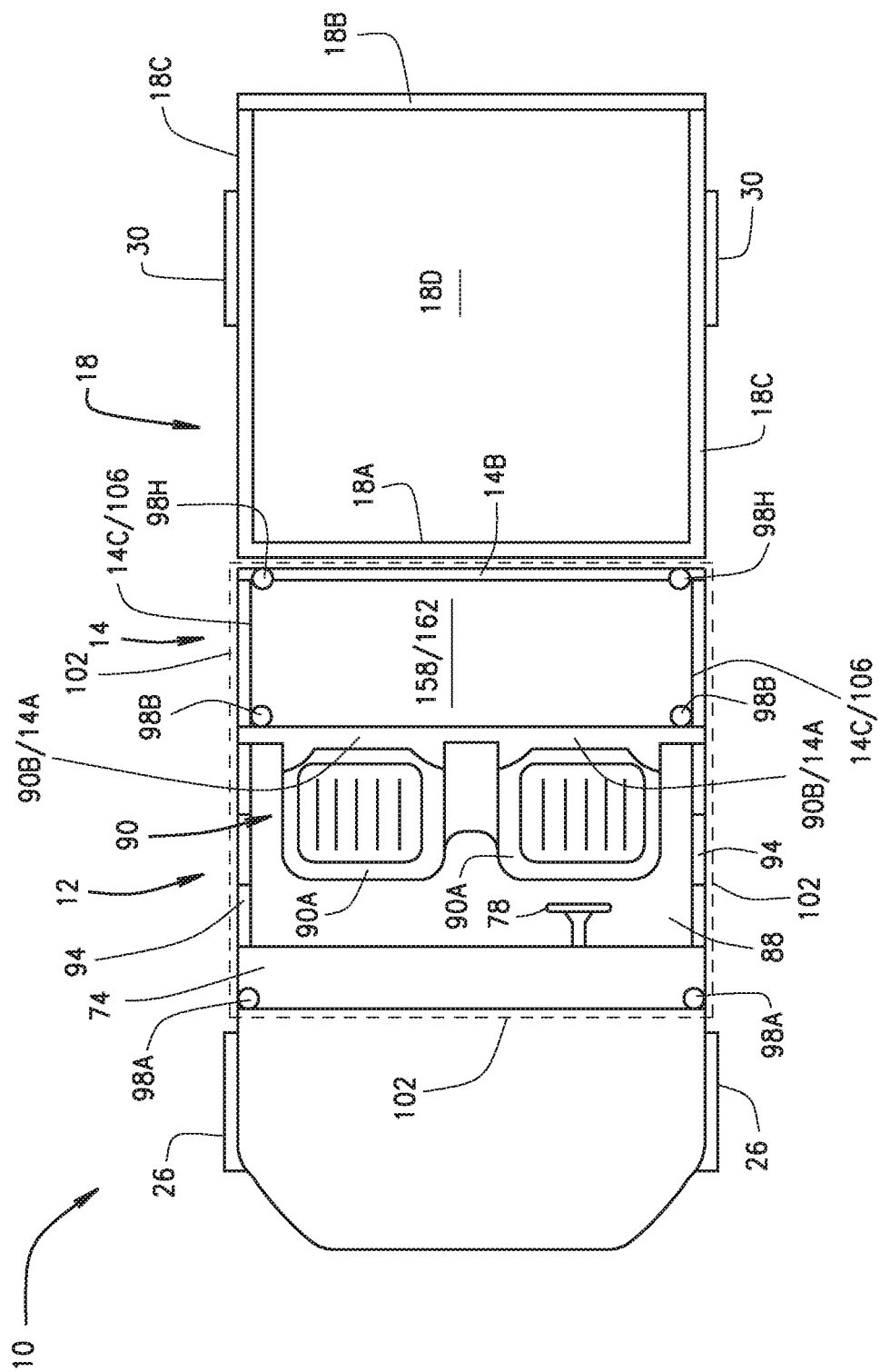
FIG. 12 is a schematic of a top view of the vehicle shown in FIG. 1, wherein the auxiliary storage compartment includes a floor mat, in accordance with various embodiments of the present disclosure.

Referring now to FIG. 12, in various embodiments, the auxiliary storage compartment 14 can include a floor mat 158 disposed over all or any portion of the floor 14D to protect the floor 14D. The floor mat 158 can be fabricated of any desired material. For example, in various embodiments, the floor mat 158 can be fabricated of a flexible rubber-like material that provides a non-slip surface operable to resist the sliding of items disposed within the auxiliary storage compartment 14 from easily sliding across the floor 14D. Or, in various embodiments, the floor mat 158 can be fabricated of harder, more rigid material, e.g., plastic, polycarbonate, fiberglass, etc., that allows items to be easily slid/moved across the floor mat 158, within the auxiliary storage compartment 14. In various implementations, the floor mat 158 can cover any stowage wells 110 and/or access panels 114 that are included in the auxiliary storage compartment 14, such that the floor mat 158 needs to be rolled back or lifted to access such stowage wells 110 and/or access panels 114. Additionally or alternatively, in various embodiments, the floor mat 158 can include cut-outs that allow ready access to any stowage wells 110 and/or access panels 114 that are included in the auxiliary storage compartment 14.

In yet other embodiments, the auxiliary storage compartment 14 can include a liner 162 disposed over all or any portion of the floor 14D, and one or more of the front wall 14A, sidewalls/access doors 14C/106, and/or back wall 14B to protect the floor 14D and/or one or more of the front wall 14A, sidewalls/access doors 14C/106, and/or back wall 14B. Similarly to the floor mat 158 described above, the liner 162 can be fabricated of any desired material. For example, in various embodiments, the liner 162 can be fabricated of a flexible rubber-like material that provides a non-slip surface operable to resist the sliding of items disposed within the auxiliary storage compartment 14 from easily sliding across the floor 14D. Or, in various embodiments, the liner 162 can be fabricated of harder, more rigid material, e.g., plastic, polycarbonate, fiberglass, etc., that allows items to be easily slid/moved across the liner 162, within the auxiliary storage compartment 14. In such embodiments, the liner 162 can include cut-outs that allow ready access to any stowage wells 110 and/or access panels 114, and/or storage pockets 130 and/or storage boxes 134 that are included in the auxiliary storage compartment 14.

Figure 13:
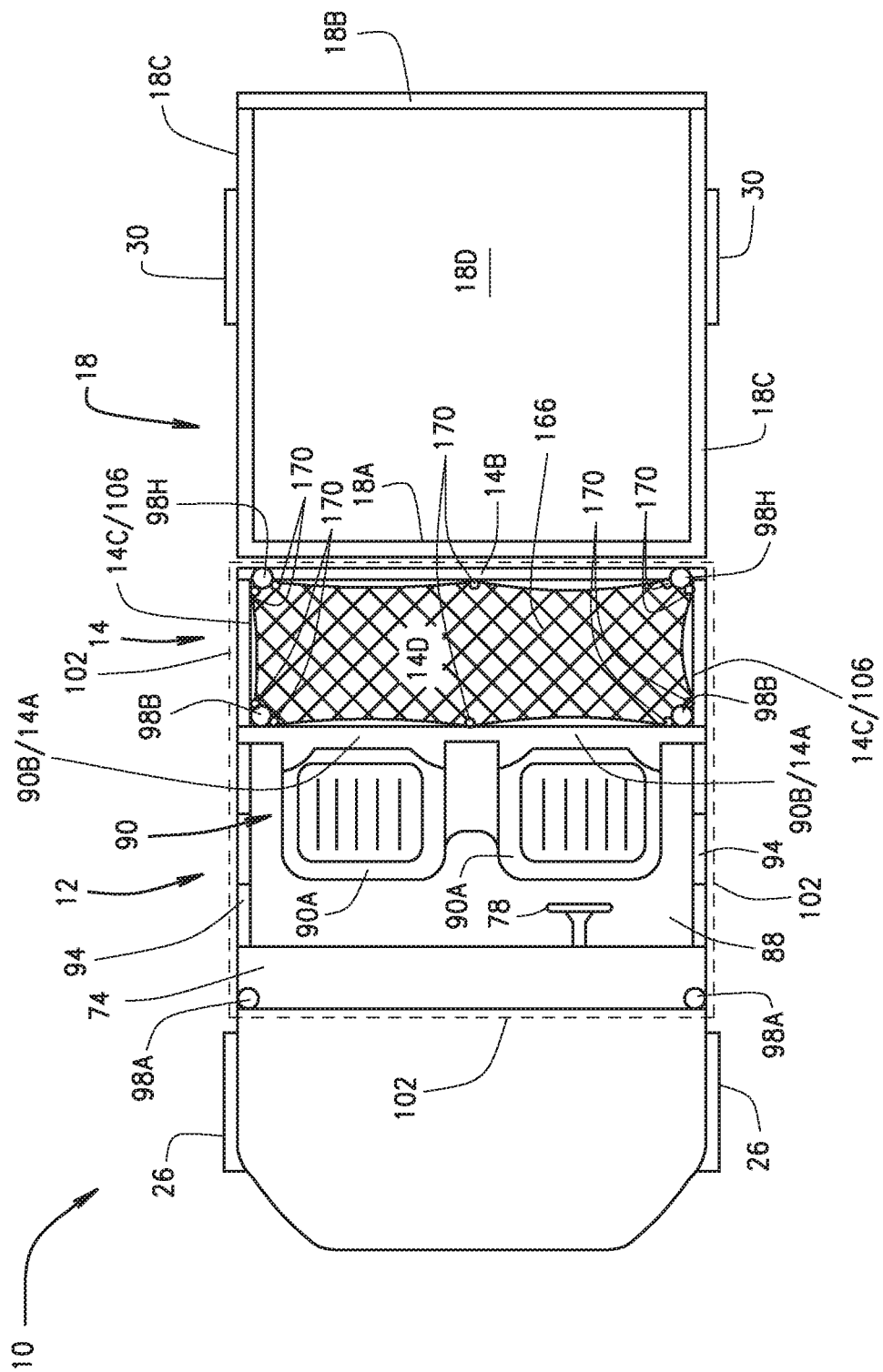
FIG. 13 is a schematic of a top view of the vehicle shown in FIG. 1, wherein the auxiliary storage compartment includes a cargo net, in accordance with various embodiments of the present disclosure.

Referring now to FIG. 13, in various embodiments, the auxiliary storage compartment 14 can include a cargo net 166 disposed over all or any portion of the interior space of the auxiliary storage compartment 14 for holding items disposed within the auxiliary storage compartment 14 steady and preventing such items from moving around within the auxiliary storage compartment 14. In various embodiments, the cargo net 166 comprises interwoven or interconnected elastic cords such that the cargo net 166 has elastic properties and can be stretched across the auxiliary storage compartment 14 and any items disposed therein. The cargo net 166 can be removably connectable to net mounts 168 attached to the floor 14D, and/or the front wall 14A, and/or the sidewalls/access doors 14C/106, and/or the back wall 14B. The mounts 168 can be attached to the floor 14D, and/or the front wall 14A, and/or the sidewalls/access doors 14C/106, and/or the back wall 14B various locations of, such that the cargo net can be disposed substantially flush to the floor, across a top edge of the four walls 14A/14B/14C/106, or at any height H (FIG. 6) within the auxiliary storage compartment 14. The mounts can comprise, buttons, hooks, cleats, snaps, or any other device suitable for removably connecting the cargo net 166 to the floor 14D, and/or the front wall 14A, and/or the sidewalls/access doors 14C/106, and/or the back wall 14B.

Figure 14:
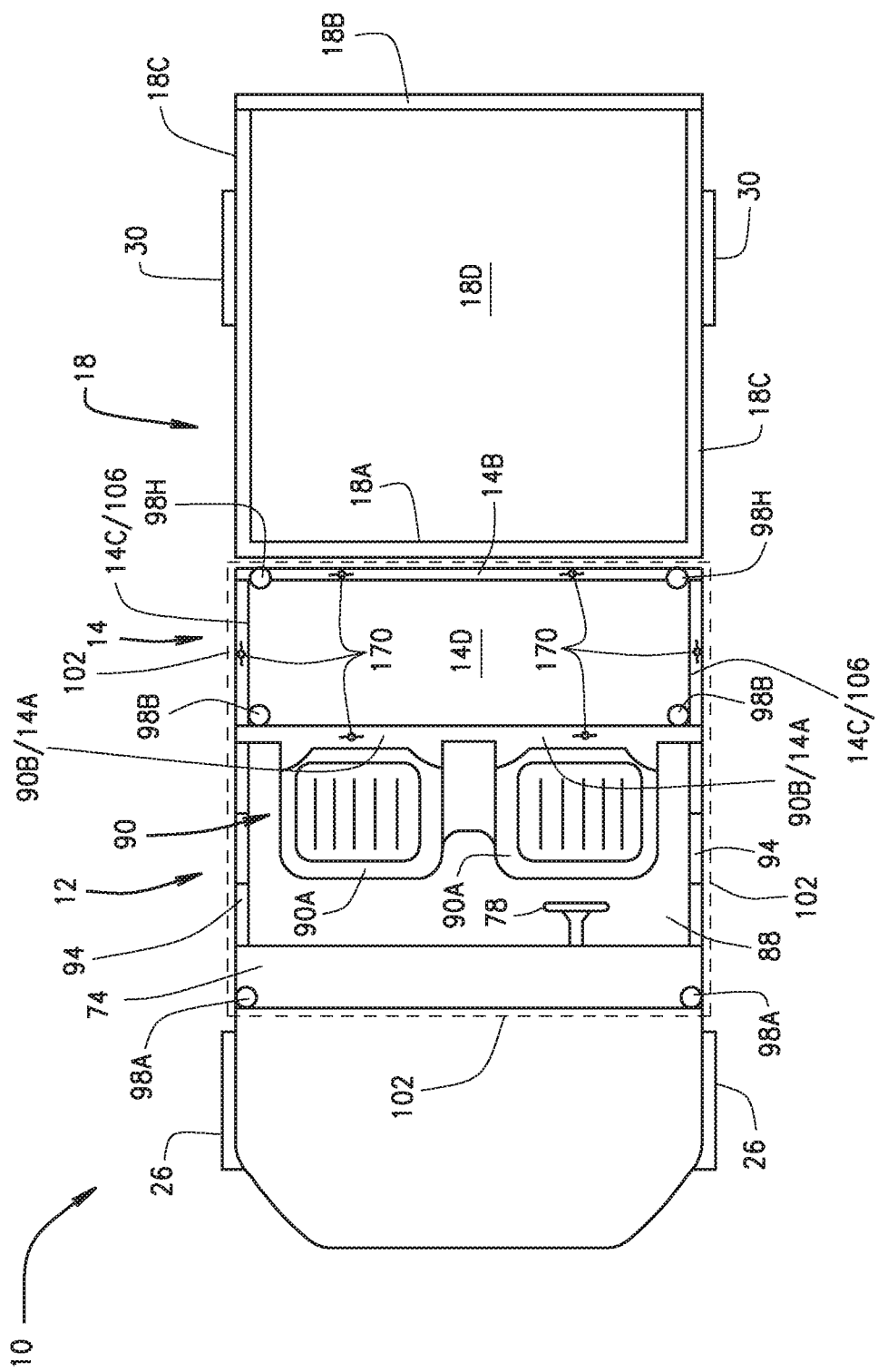
FIG. 14 is a schematic of a top view of the vehicle shown in FIG. 1, wherein the auxiliary storage compartment includes a portion of one or more fastening system disposed along a top edge of one or more walls of the auxiliary storage compartment, in accordance with various embodiments of the present disclosure.

Referring now to FIG. 14, in various embodiments, the top edge of one or more of the front wall 14A, sidewalls/access doors 14C/106 and/or back wall 14B can comprise one or more first portions 170 of a latching system (e.g., latching system 122, described above) for attaching various vehicle accessories to the respective top edge. In various embodiments, each latching system first portion 170 can be integrally formed within the respective top edge, while in various other embodiments, C-channel or square/rectangular tubing, having the latching system first portion(s) 170 integrally formed therein, can be attached to the respective top edge. Second portions (not shown) of the latching system are integrally formed with, or attached to, the respective vehicle accessory such that the accessory, e.g., a utility rack, a tool rack, a gun rack, a bow and arrow rack, a helmet hook/rack/pedestal, a bag/luggage rack/hook, a water/fluid pump, a small air compressor, and small generator, a wall extension panel, etc., can be mounted to the top edge of the respective wall 14A/14B/14C/106.

Similarly to latching system 122, described above, the latching system first portion 170 can comprise a first portion of any latching, fastening or connecting system suitable for connecting to the respective wall top edge an accessory comprising the corresponding second portion, wherein the first and second portions are engageable with, or connectable to, each other. For example, in various embodiments, each first portion 170 can comprise a portion of a quick-connect system, wherein the first portion 170 comprises an elongated, or winged, hole formed in the respective wall top edge, or formed in the channel or tubing attached to the respective wall top edge. In such embodiments, the quick-connect latching system second portion can comprise a feature or fixture of the respective accessory having a corresponding elongated, or winged, hole formed therein. The corresponding elongated, or winged, holes can be aligned, whereafter a spring loaded T-shaped key or pin of the quick-connect latching system can be inserted through the aligned first and second holes and turned, e.g., ¼ to ¾ turn, to engage the T-shaped key or pin with a back side of first portion hole and a top side of the second portion hole, thereby attaching the respective accessory to the respective wall top edge. As another example, in various other embodiments, each first portion 170 can comprise a threaded hole formed in the respective wall top edge, or formed in the channel or tubing attached to the respective wall top edge. In such embodiments, the latching system second portion can comprise a feature or fixture of the respective accessory having a hole formed therein. A threaded bolt can be inserted through the second portion hole and treaded into the first portion threaded hole to thereby attach the respective accessory to the respective wall top edge. As still another example, in other embodiments, each first portion 170 can comprise a rotatable or pivotable latch mounted to the wall top edge, wherein the first portion/latch 170 is interlockingly engageable with a latch receiver fixed to a fixture or feature of the respective accessory to thereby attach the respective accessory to the respective wall top edge.

Although the C-channel or square/rectangular tubing, having the latching system first portion(s) 170 integrally formed therein, has been described above as being attached to the top edge of one or more of the walls 14A/14B/14C/106, it is envisioned that, in various embodiments, the C-channel or square/rectangular tubing, having the latching system first portion(s) 170 integrally formed therein, can be attached to any portion of one or more of walls 14A/14B/14C/106 and/or the floor 14D, and/or any portion of the ROPS 98 (shown in FIGS. 1, 2, 3 and 6), e.g., the extended portion of the ROPS 98. Accordingly, vehicle accessories can be mounted to any portion of the auxiliary storage compartment and/or the ROPS 98, via the C-channel or square/rectangular tubing, having the latching system first portion(s) 170 integrally formed therein.

Referring now to FIG. 15, in various embodiments, one or more vehicle accessory (identified in FIG. 15 by reference number 174) e.g., a utility rack, a tool rack, a gun rack, a bow and arrow rack, a helmet hook/rack/pedestal, a bag/luggage rack/hook, a cargo net, a shelf, etc., can be mounted direct to the ROPS 98 above the auxiliary storage compartment 14. For example, the space above the auxiliary storage compartment 14, and between the ROPS rear and auxiliary uprights 98B and 98E can utilized. For example, in various embodiments, one or more vehicle accessory 174 can be mounted to one or more ROPS rear upright 98B, and/or one or more ROPS auxiliary upright 98H, and/or one or more crossbar 98E utilizing the space above the auxiliary storage compartment 14. For example, in addition to the non-limiting examples of accessories 174 illustrated in FIG. 15 and described herein, and among many other possible accessories 174, it is envisioned that at least one vehicle accessory 174 can comprise a cargo net or shelf that can be disposed in the space above the auxiliary storage compartment 14 and mounted or connected to and between the rear uprights 98B and the auxiliary uprights 98H of the ROPS 98. The vehicle accessory(ies) 174 can be mounted to any portion of the ROPS 98 utilizing any suitable fastening system, method or device, e.g., welding, gluing, rivets, screws, bolts, etc.

Additionally, in order to provide the passenger compartment 12 and/or the auxiliary storage compartment 14 additional protection from environmental elements such as sun, rain, sleet, snow, etc., the vehicle 10 can include one or more ROPS enclosure panel. The enclosure panel(s) can be fixedly and/or removably connected to any portion of the ROPS 98 utilizing any suitable fastening system, method or device, e.g., welding, gluing, rivets, screws, bolts, snaps, hinges, hook and loop connectors (e.g., Velcro®), etc. Examples of such enclosure panels can include: 1) roll up/down/side-to-side, or swing open/closed passenger compartment doors (with or without one or more transparent inserts or windows); and/or 2) a roll up/down/side-to-side, or swing open/closed windshield (with one or more transparent inserts or windows); and/or 3) roll up/down/side-to-side or swing up/down, or swing open/closed auxiliary storage compartment side panels and or rear panel (with or without one or more transparent inserts or windows); and/or 4) any other suitable fixed or removable passenger compartment 12 and/or auxiliary storage compartment 14 enclosure panel. It is envisioned that each respective enclosure panel can be fabricated of a solid, hard material such as metal, molded plastic or fiberglass, etc., and/or a soft flexible material such as canvas, vinyl, plastic, etc.

In various other embodiments, one or more of the auxiliary storage compartment 14 front wall 14A, back wall 14B, sidewalls/access doors 14C/106, and/or floor 14D can comprise various vehicle electronic systems and devices. For example, it is envisioned that the one or more of the front wall 14A, back wall 14B, sidewalls/access doors 14C/106, and/or floor 14D can comprise one or more stereo speakers mounted within or to the respective wall. Similarly, it is envisioned that one or more of the front wall 14A, back wall 14B, sidewalls/access doors 14C/106, and/or floor 14D can comprise one or more AC and/or DC power ports or outlets structured and operable to provide electric power (e.g., current and voltage) to personal electronics, such as cell phones, tablets, laptops and other electronic devices, that are connectable thereto.

The description herein is merely exemplary in nature and, thus, variations that do not depart from the gist of that which is described are intended to be within the scope of the teachings. Moreover, although the foregoing descriptions and the associated drawings describe example embodiments in the context of certain example combinations of elements and/or functions, it should be appreciated that different combinations of elements and/or functions can be provided by additional or alternative embodiments without departing from the scope of the disclosure. Such variations and alternative combinations of elements and/or functions are not to be regarded as a departure from the spirit and scope of the teachings.

What is claimed is:

1. An auxiliary storage compartment for a vehicle, said auxiliary storage compartment comprising:
   a floor;
   a fixed, non-movable back wall that extends upward from the floor;
   a fixed, non-movable front wall that extends upward from the floor opposite the back wall, the front wall defined by a back side of a seating structure of the vehicle in which the auxiliary storage compartment is disposed;
   a pair of opposing sidewalls disposed at opposing ends of the front wall and the back wall; and
   a top cover structured and operable to cover and protect an interior stowage space of the auxiliary storage compartment defined by the floor, back wall, front wall and opposing sidewalls.

2. The auxiliary storage compartment of claim 1, wherein the top cover is one of:
   a single-piece structure; and
   a multi-section structure.

3. The auxiliary storage compartment of claim 1, wherein the top cover is one of:
   hingedly connecting to any one or more of the back wall, front wall and opposing sidewalls; and
   removably disposable over the back wall, front wall and opposing sidewalls.

4. The auxiliary storage compartment of claim 1, wherein the top cover is structured and operable to provide a substantially water-tight seal when in a Closed position such that the interior stowage space will remain dry.

5. The auxiliary storage compartment of claim 1, wherein at least one of the front wall, opposing sidewalls and back wall include at least one of:
   one or more open storage pockets at least one of integrally formed therewith or mounted thereto;
   closable storage boxes at least one of integrally formed therewith or mounted thereto; and
   storage racks at least one of integrally formed therewith or mounted thereto.

6. The auxiliary storage compartment of claim 1, wherein a top edge of one or more of the front wall, opposing sidewalls and back wall comprises at least one latching system structured and operable for attaching various vehicle accessories to the respective top edge.

7. The auxiliary storage compartment of claim 1, wherein at least one of the opposing sidewalls define an access door movable between an Open position and a Closed position to provide access to the interior stowage space.

8. An auxiliary storage compartment for a vehicle, said auxiliary storage compartment comprising:
   a floor extending laterally across substantially the entire width of the vehicle;
   a fixed, non-movable back wall that extends upward from the floor;
   a fixed, non-movable front wall that extends upward from the floor opposite the back wall;
   a pair of opposing sidewalls disposed at opposing ends of the front wall and the back wall, and
   an access top opening defined by a top edge of the back wall, a top edge of the front wall and a top edge of each sidewall, wherein the back wall, front wall and sidewalls define an interior stowage space of the auxiliary storage compartment that is accessible from an exterior of the vehicle via the access top opening, and a top cover structured and operable to cover and protect the interior stowage space of the auxiliary storage compartment.

9. The auxiliary storage compartment of claim 8, wherein the top cover is one of:
a single-piece structure; and
a multi-section structure.

10. The auxiliary storage compartment of claim 8, wherein the top cover is one of:
hingedly connecting to any one or more of the back wall, front wall and opposing sidewalls; and
removably disposable over the back wall, front wall and opposing sidewalls.

11. The auxiliary storage compartment of claim 8, wherein the top cover is structured and operable to provide a substantially water-tight seal when in a Closed position such that the interior stowage space will remain dry.

12. The auxiliary storage compartment of claim 8, wherein at least one of the front wall, opposing sidewalls and back wall include at least one of:
one or more open storage pockets at least one of integrally formed therewith or mounted thereto;
closable storage boxes at least one of integrally formed therewith or mounted thereto; and
storage racks at least one of integrally formed therewith or mounted thereto.

13. The auxiliary storage compartment of claim 8, wherein a top edge of one or more of the front wall, opposing sidewalls and back wall comprises at least one latching system structured and operable for attaching various vehicle accessories to the respective top edge.

14. The auxiliary storage compartment of claim 8, wherein at least one of the opposing sidewalls define an access door movable between an Open position and a Closed position to provide access to the interior stowage space.

15. A vehicle, said vehicle comprising:
a chassis;
a plurality of wheels operationally connected to the chassis;
a drivetrain operatively connected to at least one of the wheels;
at least one prime mover mounted to the chassis and operatively connected to the drivetrain and structured and operable to provide motive force, via the drivetrain, to the at least one wheel operatively connected to the drivetrain;
a passenger compartment supported by the chassis, the passenger compartment comprising:
a dash console;
a floorboard; and
a passenger seating structure that includes at least one seat bottom and at least one seat back; and
an auxiliary storage compartment for the vehicle, said auxiliary storage compartment comprising:
a floor;
a fixed, non-movable back wall that extends upward from the floor;
a fixed, non-movable front wall that extends upward from floor opposite the back wall, the front wall defined by a back side of a seating structure of the vehicle in which the auxiliary storage compartment is disposed;
a pair of opposing sidewalls disposed at opposing ends of the front wall and the back wall; and
a top cover is structured and operable to cover and protect an interior stowage space of the auxiliary storage compartment defined by the floor, back wall, front wall and opposing sidewalls.

16. The vehicle of claim 15, wherein:
the top cover is one of:
a single-piece structure; and
a multi-section structure; and
the top cover is at least one of:
hingedly connecting to any one or more of the back wall, front wall and opposing sidewalls; and
removably disposable over the back wall, front wall and opposing sidewalls.

17. The vehicle of claim 15, wherein the top cover is structured and operable to provide a substantially water-tight seal when in a Closed position such that the interior stowage space will remain dry.

18. The vehicle of claim 15, wherein at least one of the front wall, opposing sidewalls and back wall include at least one of:
one or more open storage pockets at least one of integrally formed therewith or mounted thereto;
closable storage boxes at least one of integrally formed therewith or mounted thereto; and
storage racks at least one of integrally formed therewith or mounted thereto.

19. The vehicle of claim 15, wherein a top edge of one or more of the front wall, opposing sidewalls and back wall comprises at least one latching system structured and operable for attaching various vehicle accessories to the respective top edge.

20. The vehicle of claim 15, wherein at least one of the opposing sidewalls define an access door movable between an Open position and a Closed position to provide access to the interior stowage space.

* * * * *